US012731022B2

(12) United States Patent
Ozcan et al.

(10) Patent No.: US 12,731,022 B2
(45) Date of Patent: Sep. 8, 2026

(54) MISALIGNMENT-RESILIENT DIFFRACTIVE OPTICAL NEURAL NETWORKS

(71) Applicant: THE REGENTS OF THE UNIVERSITY OF CALIFORNIA, Oakland, CA (US)

(72) Inventors: Aydogan Ozcan, Los Angeles, CA (US); Deniz Mengu, Los Angeles, CA (US); Yair Rivenson, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 953 days.

(21) Appl. No.: 17/920,778

(22) PCT Filed: May 21, 2021

(86) PCT No.: PCT/US2021/033771

§ 371 (c)(1),
(2) Date: Oct. 21, 2022

(87) PCT Pub. No.: WO2021/237170

PCT Pub. Date: Nov. 25, 2021

(65) Prior Publication Data

US 2023/0162016 A1 May 25, 2023

Related U.S. Application Data

(60) Provisional application No. 63/029,268, filed on May 22, 2020.

(51) Int. Cl.
*G06N 3/067* (2006.01)

(52) U.S. Cl.
CPC .......... *G06N 3/067* (2013.01); *G06N 3/0675* (2013.01)

(58) Field of Classification Search
CPC ...... G06N 3/067; G06N 3/0675; G06N 3/084; G06N 3/063; G02B 27/4205
See application file for complete search history.

(56) References Cited

U.S. PATENT DOCUMENTS 4,963,725 A 10/1990 Hong et al.
5,080,464 A 1/1992 Toyoda
(Continued)

FOREIGN PATENT DOCUMENTS

WO WO 2019/200289 10/2019
WO WO 2020/247828 A1 12/2020
(Continued)

OTHER PUBLICATIONS

Vincent et al. 2008. Extracting and composing robust features with denoising autoencoders. In Proceedings of the 25th international conference on Machine learning (ICML '08). Association for Computing Machinery, New York, NY, USA, 1096-1103. https://doi.org/10.1145/1390156.1390294 (Year: 2008).*
(Continued)

*Primary Examiner* — James D. Rutten
(74) *Attorney, Agent, or Firm* — VISTA IP LAW GROUP LLP

(57) ABSTRACT

A diffractive optical neural network includes one more layers that are resilient to misalignments, fabrication-related errors, detector noise, and/or other sources of error. A diffractive optical neural network model is first trained with a computing device to perform a statistical inference task such as image classification (e.g., object classification). The model is trained using images or training optical signals along with random misalignments of the plurality of layers, fabrication-related errors, input plane or output plane misalignments, and/or detector noise, followed by computing an optical output of the diffractive optical neural network model through optical transmission and/or reflection result-
(Continued)

ing from the diffractive optical neural network and iteratively adjusting complex-valued transmission and/or reflection coefficients for each layer until optimized transmission/reflection coefficients are obtained. Once the model is optimized, the physical embodiment of the diffractive optical neural network is manufactured.

33 Claims, 19 Drawing Sheets

(56) References Cited

U.S. PATENT DOCUMENTS

| | | | | |
|---|---|---|---|---|
| 5,095,459 | A | 3/1992 | Ohta et al. | |
| 5,255,362 | A | 10/1993 | Brandstetter et al. | |
| 5,440,671 | A | 8/1995 | Shiratani et al. | |
| 5,842,191 | A | 11/1998 | Stearns | |
| 6,445,470 | B1 | 9/2002 | Jenkins et al. | |
| 7,512,473 | B2 | 3/2009 | Nakao | |
| 7,512,573 | B2 * | 3/2009 | Martinez | G06N 3/067 706/15 |
| 10,217,023 | B1 | 2/2019 | Rubin | |
| 11,017,309 | B2 | 5/2021 | Roques-Carmes et al. | |
| 11,392,830 | B2 | 7/2022 | Ozcan et al. | |
| 11,694,082 | B2 | 7/2023 | Ozcan et al. | |
| 2002/0027712 | A1 * | 3/2002 | Soskind | G02B 27/4216 359/565 |
| 2010/0209830 | A1 | 8/2010 | Carcasi et al. | |
| 2017/0351293 | A1 | 12/2017 | Carolan et al. | |
| 2019/0205946 | A1 * | 7/2019 | Mellina | G06N 3/084 |
| 2020/0327403 | A1 | 10/2020 | Du et al. | |
| 2021/0142170 | A1 | 5/2021 | Ozcan et al. | |
| 2022/0253685 | A1 | 8/2022 | Ozcan et al. | |
| 2022/0366253 | A1 | 11/2022 | Ozcan et al. | |

FOREIGN PATENT DOCUMENTS

| | | | |
|---|---|---|---|
| WO | WO 2021/050550 | A1 | 3/2021 |
| WO | WO 2021/231139 | A1 | 11/2021 |
| WO | WO 2022/006018 | A1 | 1/2022 |
| WO | WO 2022/056422 | A1 | 3/2022 |
| WO | WO 20220/87345 | A1 | 4/2022 |

OTHER PUBLICATIONS

Xue et al. "Reliable deep-learning-based phase imaging with uncertainty quantification," Optica 6, 618-629 (2019) (Year: 2019).*

Keith M. Hinrichs, John J. Piotrowski, "Neural networks for faster optical alignment," Opt. Eng. 59(7) 074107 (Jul. 31, 2020) https://doi.org/10.1117/1.OE.59.7.074107 (Year: 2020).*

Response to the extended European search report dated Mar. 10, 2025 for European Patent Application No. 21808927.4, Applicant: The Regents of University of California, (5 pages).

PCT International Search Report for PCT/US2021/033771, Applicant: The Regents of the University of California, Form PCT/ISA/210 and 220, dated Sep. 10, 2021 (3 pages).

PCT Written Opinion of the International Search Authority for PCT/US2021/033771, Applicant: The Regents of the University of California, Form PCT/ISA/237, dated Sep. 10, 2021 (6 pages).

Jingxi Li et al., Class-specific differential detection in diffractive optical neural networks improves inference accuracy, Advanced Photonics, 1 (4), 046001 (2019). https://doi.org/10.1117/1.AP.1.4.046001.

J. Bueno et al., Reinforcement learning in a large-scale photonic recurrent neural network, Optica, vol. 5, No. 6, Jun. 2018, pp. 756-760.

Julie Chang et al., Hybrid optical-electronic convolutional neural networks with optimized diffractive optics for image classification, Scientific Reports, (2018) 8:12324, DOI: 10.1038/s41598-018-30619-y, (10 pages).

J. Feldmann et al., All-optical spiking neurosynaptic networks with self-learning capabilities, Nature (May 2019) 569 (7755) 208-214, DOI:10.1038/s41586-019-1157-8.

Guy Van der Sande et al., Advances in photonic reservoir computing, Nanophotonics 2017; 6(3): 561-576.

Jonathan K. George et al., Neuromorphic photonics with electro-absorption modulators, Optics Express, vol. 27, No. 4, (Feb. 18, 2019) 5181-5191.

Yann LeCun et al., Gradient-Based Learning Applied to Document Recognition, Proc. of the IEEE, Nov. 1998 (46 pages).

Jingxi Li et al., Class-specific Differential Detection in Diffractive Optical Neural Networks Improves Inference Accuracy, (2021), (21 pages).

Xing Lin et al., All-optical machine learning using diffractive deep neural networks, Science, 10.1126/science.aat8084 (2018).

Yi Luo et al., Design of task-specific optical systems using broadband diffractive neural networks, Light: Science & Applications (2019) 8:112.

Alireza Marandi et al., Network of Time-Multiplexed Optical Parametric Oscillators as a Coherent Ising Machine, arXiv:1407.2871v1 [quant-ph] Jul. 10, 2014, (23 pages).

Armin Mehrabian et al., PCNNA: A Photonic Convolutional Neural Network Accelerator, arXiv:1807.08792v1 [cs.ET] Jul. 23, 2018, (5 pages).

Deniz Mengu et al., Analysis of Diffractive Optical Neural Networks and Their Integration with Electronic Neural Networks, IEEE J Sel Top Quantum Electron (2020) 26(1), DOI:10.1109/JSTQE.2019.2921376.

Mario Miscuglio et al., All-Optical Nonlinear Activation Function for Photonic Neural Networks, Optical Society of America, (2018), (13 pages).

Antonio Ribeiro et al., Demonstration of a 4 x 4-port universal linear circuit, Optica, vol. 3, No. 12, (Dec. 2016), 1348-1357.

Bhavin J. Shastri et al., Principles of Neuromorphic Photonics: A Volume in the Encyclopedia of Complexity and Systems Science, Second Edition, https://www.researchgate.net/publication/327229989 (Jan. 2018), (38 pages).

Alexander N. Tait et al., Neuromorphic photonic networks using silicon photonic weight banks, Scientific Reports, (2017) 7:7430, DOI:10.1038/s41598-017-07754-z, (10 pages).

Han Xiao et al., Fashion-MNIST: a Novel Image Dataset for BenchmarkingMachine Learning Algorithms, arXiv:1708.07747v2 [cs.LG] (Sep. 15, 2017), (6 pages).

PCT International Preliminary Report on Patentability (Chapter I of the Patent Cooperation Treaty) for PCT/US2021/033771, Applicant: The Regents of the University of California, Form PCT/IB/326 and 373, dated Dec. 1, 2022 (8 pages).

Bagherian, H. et al., On-Chip Optical Convolutional Neural Networks, arXiv:1808.03303v2 [cs.ET] Aug. 16, 2018.

Brunner, D. et al., Parallel photonic information processing at gigabyte per second data rates using transient states, Nature Communications, 4:1364, DOI: 10.1038/ncomms2368, www.nature.com/naturecommunications.

Bueno, J. et al., Reinforcement Learning in a large scale photonic Recurrent Neural Network, arXiv:1711.05133v2 [cs.NE] Nov. 15, 2017.

Chakraborty, I. et al., Toward Fast Neural Computing using All-Photonic Phase Change Spiking Neurons, arXiv:1804.00267v2 [cs.ET] Aug. 28, 2018.

Chang, J. et al., Hybrid optical-electronic convolutional neural networks with optimized diffractive optics for image classification, Scientific Report (2018) 8:12324, DOI:10.1038/s41598-018-30619-y.

Chen, Y. et al., Deep Learning-Based Classification of Hyperspectral Data, IEEE Journal of Selected Topics in Applied Earth Observations and Remote Sensing, vol. 7, No. 6, Jun. 2014.

Cignoni, P. et al., MeshLab: an Open-Source Mesh Processing Tool, Eurographics Italian Chapter Conference (2008).

Farhat, N. H. et al., Optical implementation of the Hopfield model, May 15, 1985, vol. 24, No. 10, Applied Optics, 1469-1475.

Girshick, R. et al., Rich feature hierarchies for accurate object detection and semantic segmentation Tech report (v5), arXiv:1311.2524v5 [cs.CV] Oct. 22, 2014.

(56) References Cited

OTHER PUBLICATIONS

Golik, P. et al., Cross-Entropy vs. Squared Error Training: a Theoretical and Experimental Comparison, Human Language Technology and Pattern Recognition, Computer Science Department, RWTH Aachen University, 52056 Aachen, Germany (2013).
Grischkowsky, D. et al., Far-infrared time-domain spectroscopy with terahertz beams of dielectrics and semiconductors, J. Opt. Soc. Am. B/vol. 7, No. 10/Oct. 1990.
Hermans, M. etal., Trainable & Dynamic Computing: Error Backpropagation Through Physical Media, arXiv:1407.6637v1 [cs.NE] Jul. 24, 2014.
Hughes, T.W. et al., Training of photonic neural networks through in situ backpropagation, arXiv:1805.09943v1 [physics.optics] May 25, 2018.
Kazhdan, M. et al., Screened Poisson Surface Reconstruction, ACM Transactions on Graphics, vol. VV, No. N, Article XXX, Publication date: 2013.
Khorasaninejad, M. et al., Metalenses at visible wavelengths: Diffraction-limited focusing and subwavelength resolution imaging, sciencemag.org, Science, Jun. 3, 2016, vol. 352, Issue 6290, 1190-1194.
Kildishev, A. V. et al., Planar Photonics with Metasurfaces, Science 339, 1232009 (2013). DOI: 10.1126/science.1232009.
Kingma, D. P. et al., ADAM: a Method for Stochastic Optimization, arXiv:1412.6980v9 [cs.LG] Jan. 30, 2017.
Lecun, Y. et al., GradientBased Learning Applied to Document Recognition, Proc. of the IEEE, Nov. 1998 (46 bages).
Lin, X. et al., All-optical machine learning using diffractive deep neural networks, Science 361, 1004-1008 (2018), Sep. 7, 2018.
Psaltis, D. et al., Optical information processing based on an associative-memory model of neural nets with thresholding and feedback, Optics Letters, vol. 10, No. 2, Feb. 1985.
Psaltis, D. et al., Adaptive optical networks using photorefractive crystals, Applied Optics, vol. 27, No. 9, May 1, 1988.
Shastri, B. et al., Principles of Neuromorphic Photonics, arXiv:1801.00016v1 [cs.ET] Dec. 29, 2017.
Shen, Y. et al., Deep Learning with Coherent Nanophotonic Circuits, arXiv:1610.02365v1 [physics.optics] Oct. 7, 2016.
Srivastava, N. et al., Dropout: A Simple Way to Prevent Neural Networks from Overfitting, Journal of Machine Learning Research 15 (2014) 1929-1958 Submitted Nov. 2013; Published Jun. 2014.
Tang, Y. et al., Deep Learning using Linear Support Vector Machines, arXiv:1306.0239v4 [cs.LG] Feb. 21, 2015.
Trabelsi, C. et al., Deep Complex Networks, arXiv:1705.09792v4 [cs.NE] Feb. 25, 2018.
Wagner, K. et al., Multilayer optical learning networks, Dec. 1, 1987, vol. 26, No. 23, Applied Optics, 5061-5076.
Wan, Li et al., Regularization of Neural Networks using DropConnect, Proceedings of the 30 th International Conference on Machine Learning, Atlanta, Georgia, USA, 2013.
Wang, Z. et al., Image Quality Assessment: From Error Visibility to Structural Similarity, IEEE Transactions on Image Processing, vol. 13, No. 4, Apr. 2004.
Weverka, R. T. et al., Fully interconnected, two-dimensional neural arrays using wavelength-multiplexed volume holograms, Optics Letters, vol. 16, No. 11, Jun. 1, 1991.
Xiao, Y. et al., Nonlinear Metasurface Based on Giant Optical Kerr Response of Gold Quantum Wells, ACS Photonics, 5(5), May 1, 2018, DOI:10.1021/acsphotonics.7b01140.
Yin, X. et al., Artificial Kerr-type medium using metamaterials, Apr. 9, 2012, vol. 20, No. 8, Optics Express, 8543-8550.
PCT International Search Report for PCT/US2019/027275, Applicant: The Regents of the University of California, Form PCT/ISA/210 and 220, dated Aug. 19, 2019 (5 pages).
PCT Written Opinion of the International Search Authority for PCT/US2019/027275, Applicant: The Regents of the University of California, Form PCT/ISA/237, dated Aug. 19, 2019 (9 pages).
Javidi, B. et al., Optical implementation of neural networks for face recognition by the use of nonlinear joint transform correlators, Applied Optics, vol. 34, No. 20, Jul. 10, 1995, 3950-3962.
Jutamulia, S. et al., Overview of hybrid optical neural networks, Optics & Laser Technology, vol. 28, No. 2, pp. 59-72, 1996.
Psaltis, D. et al., Holography in artificial neural networks. Nature. 343, 325-330 (1990).
Soures, N. et al., Neuro-MMI: A Hybrid Photonic-Electronic Machine Learning Platform. In 2018 IEEE Photonics Society Summer Topical Meeting Series (SUM); 2018; pp. 187-188.
Yu, F. T. S., II Optical Neural Networks: Architecture, Design and Models. In Progress in Optics; Wolf, E., Ed.; Elsevier, 1993; vol. 32, pp. 61-144.
Yu, F. et al., Flat optics with designer metasurfaces. Nature Materials. 13, 139-150 (2014).
Caulfield, H.J. et al., Optical Neural Networks. Proc. IEEE 1989, 77 (10), 1573-1583.
PCT International Preliminary Report on Patentability (Chapter I of the Patent Cooperation Treaty) for PCT/US2019/027275, Applicant: The Regents of the University of California, Form PCT/IB/326 and 373, dated Oct. 22, 2020 (11 pages).
The extended European search report dated Jun. 28, 2024 for European Patent Application No. 21808927.4, Applicant: The Regents of University of California, (10 pages).
Yi Luo et al., Broadband Diffractive Neural Networks, 2020 Conference on Lasers and Electro-Optics (CLEO), OSA, May 10, 2020, pp. 1-2, XP033824502.
Passalis Nikolaos et al., Training Deep Photonic Convolutional Neural Networks with Sinusoidal Activation, IEEE Transactions on Emerging Topics in Computational Intelligence, IEEE, vol. 5, No. 3, Jun. 28, 2019, pp. 384-393, XP011856900.

* cited by examiner

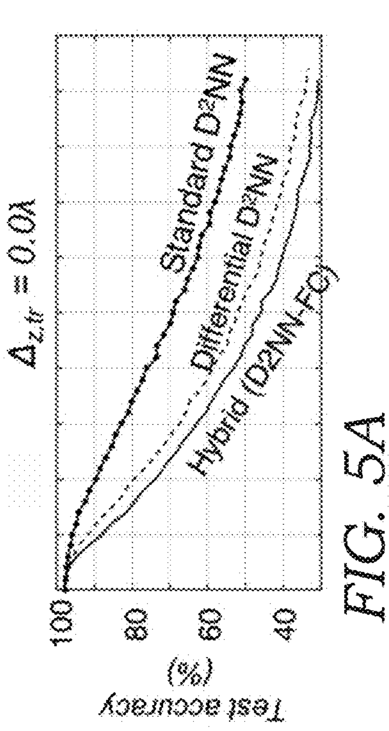

FIG. 5A

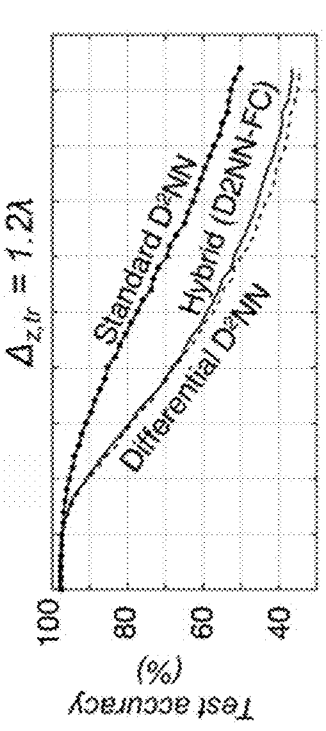

FIG. 5B

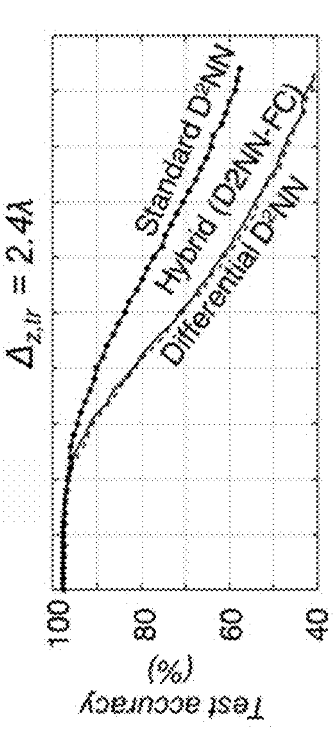

FIG. 5C

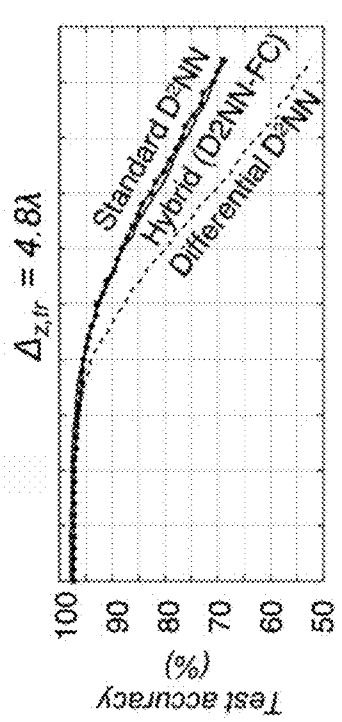

FIG. 5D

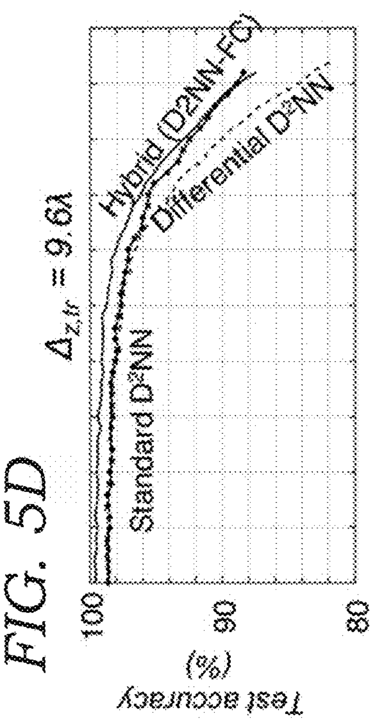

FIG. 5E

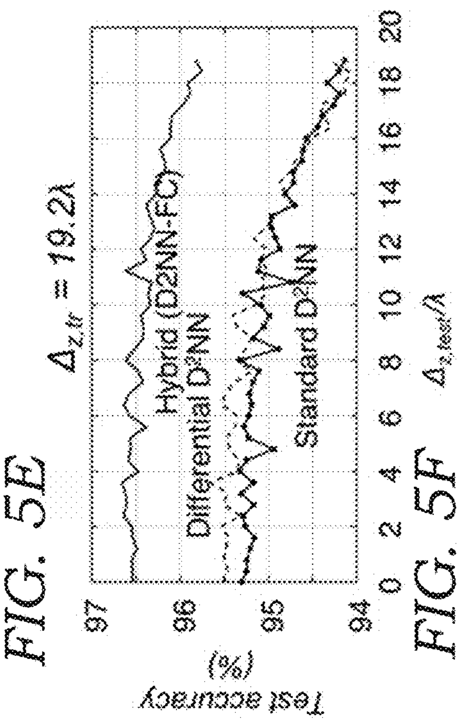

FIG. 5F $\Delta_{z,tr}$ = 4.8λ
Standard D²NN
Hybrid (D2NN-FC)
Differential D²NN
Test accuracy (%)
$\Delta_{z,tr}$ = 9.6λ
Hybrid (D2NN-FC)
Differential D²NN
Standard D²NN
$\Delta_{z,tr}$ = 19.2λ
Hybrid (D2NN-FC)
Differential D²NN
Standard D²NN
$\Delta_{z,test}/\lambda$ $\Delta_{z,tr}$ = 0.0λ
Standard D²NN
Differential D²NN
Hybrid (D2NN-FC)
Test accuracy (%)
$\Delta_{z,tr}$ = 1.2λ
Standard D²NN
Hybrid (D2NN-FC)
Differential D²NN
$\Delta_{z,tr}$ = 2.4λ
Standard D²NN
Hybrid (D2NN-FC)
Differential D²NN

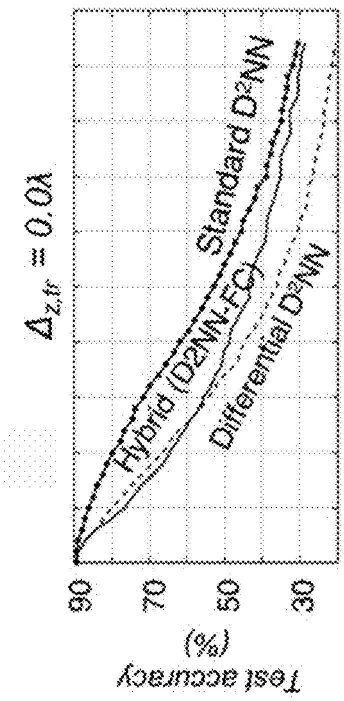

FIG. 13A

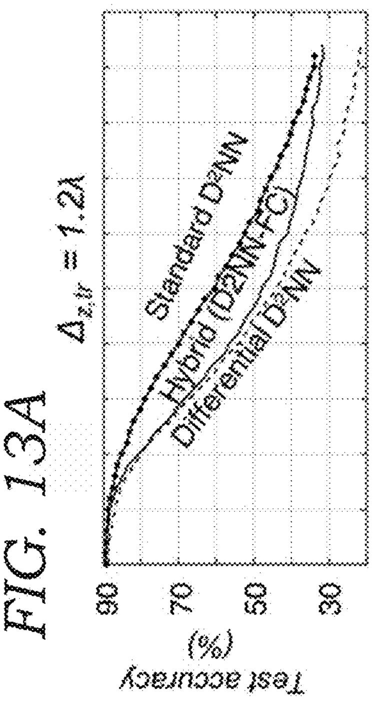

FIG. 13B

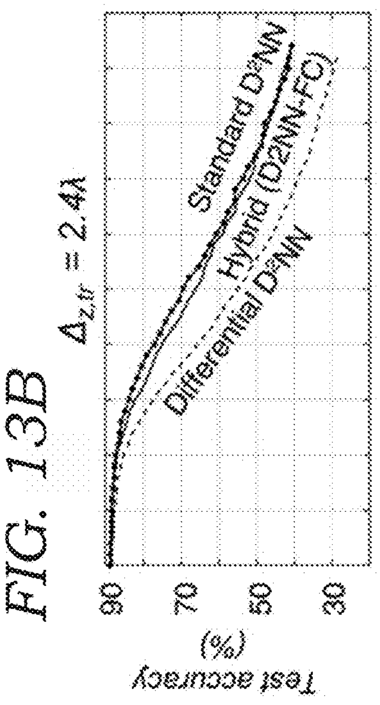

FIG. 13C

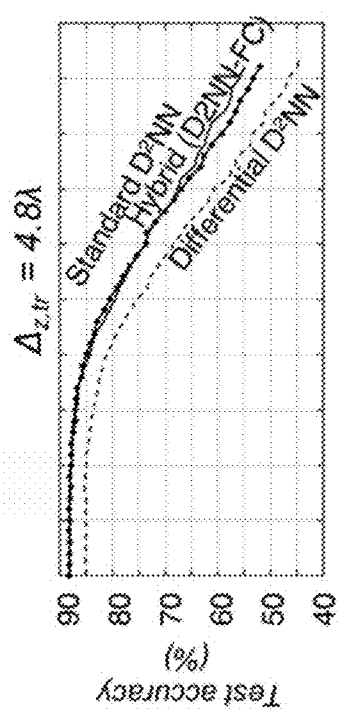

FIG. 13D

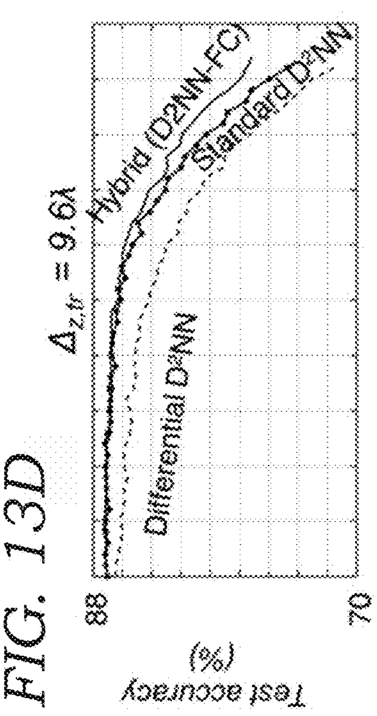

FIG. 13E

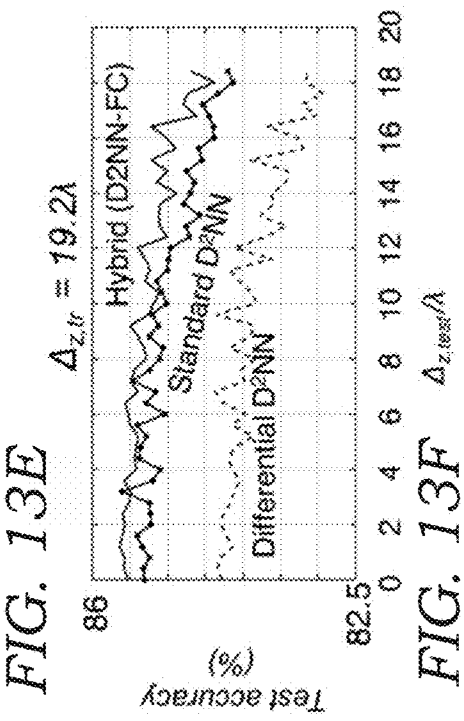

FIG. 13F $\Delta_{z,tr}$ = 4.8λ
Standard D²NN
Hybrid (D2NN-FC)
Differential D²NN
Test accuracy (%)
$\Delta_{z,tr}$ = 9.6λ
Hybrid (D2NN-FC)
Standard D²NN
Differential D²NN
Test accuracy (%)
$\Delta_{z,tr}$ = 19.2λ
Hybrid (D2NN-FC)
Standard D²NN
Differential D²NN
Test accuracy (%)
$\Delta_{z,test}/\lambda$ $\Delta_{z,tr}$ = 0.0λ
Standard D²NN
Hybrid (D2NN-FC)
Differential D²NN
Test accuracy (%)
$\Delta_{z,tr}$ = 1.2λ
Standard D²NN
Hybrid (D2NN-FC)
Differential D²NN
Test accuracy (%)
$\Delta_{z,tr}$ = 2.4λ
Standard D²NN
Hybrid (D2NN-FC)
Differential D²NN
Test accuracy (%)

MISALIGNMENT-RESILIENT DIFFRACTIVE OPTICAL NEURAL NETWORKS

RELATED APPLICATION

This Application is a U.S. National Stage filing under 35 U.S.C. § 371 of International Application No. PCT/US2021/033771, filed on May 21, 2021, which claims priority to U.S. Provisional Patent Application No. 63/029,268 filed on May 22, 2020, which is are hereby incorporated by reference. Priority is claimed pursuant to 35 U.S.C. §§ 119, 371 and any other applicable statute.

TECHNICAL FIELD

The technical field generally relates to optical-based deep learning physical architectures or platforms that can perform various complex functions and tasks that current computer-based neural networks can implement. The optical deep learning physical architecture or platform has applications in image analysis, feature detection, object classification, camera designs, and other optical components that can learn to perform unique functions or tasks. In particular, the technical field relates to such optical-based architectures and platforms that are trained that significantly increases the robustness of diffractive networks against 3D misalignments and fabrication tolerances in the physical implementation of a trained diffractive network.

BACKGROUND

Deep learning has been redefining the state-of-the-art for processing various signals collected and digitized by different sensors, monitoring physical processes for e.g., biomedical image analysis, speech recognition, holography, among many others. Furthermore, deep learning and related optimization tools have been harnessed to find data-driven solutions for various inverse problems arising in, e.g., microscopy, nanophotonic designs, and plasmonics. These demonstrations and others have been motivating some of the recent advances in optical neural networks and related optical computing techniques that aim to exploit the computational speed, power-efficiency, scalability and parallelization capabilities of optics for machine intelligence applications.

Toward this broad goal, Diffractive Deep Neural Networks ($D^2NN$) have been introduced as a machine learning framework that unifies deep learning-based training of matter with the physical models governing light propagation to enable all-optical inference through a set of diffractive layers. An example of $D^2NN$ is found in International Patent Application Publication No. WO2019200289A1. The training stage of a diffractive network is performed using a computer, and relies on deep learning and error backpropagation methods to tailor the light-matter interaction across a set of diffractive layers that collectively perform a given machine learning task, e.g., object classification. Previous studies on $D^2NNs$ have demonstrated the generalization capability of these multi-layer diffractive optical neural network designs to new, unseen image data. For example, using a 5-layer diffractive network architecture, >98% and >90% all-optical blind testing accuracies have been reported for the classification of the images of handwritten digits (MNIST) and fashion products (Fashion-MNIST) that are encoded in the amplitude and phase channels of the input plane, respectively. Successful experimental demonstrations of these all-optical classification systems have been reported using 3D-printed diffractive layers that conduct inference by modulating the incoming object wave at terahertz (THz) wavelengths.

Despite the lack of nonlinear optical elements in these previous implementations, diffractive optical neural networks have been shown to offer significant advantages in terms of (1) inference accuracy, (2) diffraction efficiency and (3) signal contrast, when the number of successive diffractive layers in the network design is increased. A similar depth advantage has also demonstrated been demonstrated, where instead of a statistical inference task such as image classification, the $D^2NN$ framework was utilized to solve an inverse design problem to achieve e.g., spatially-controlled wavelength de-multiplexing of a broadband source. While these multi-layer diffractive architectures offer significantly better performance for generalization and application-specific design merits, they also pose practical challenges for the fabrication and opto-mechanical assembly of these trained diffractive models.

SUMMARY

In one embodiment, a diffractive optical neural network training method is disclosed that substantially increases the robustness of diffractive optical neural networks against physical misalignments and fabrication tolerances. The method models and introduces these undesired system variations and layer-to-layer misalignments as continuous random variables during the deep learning-based training of the diffractive model to significantly improve the error tolerance margins of ultimately fabricated diffractive optical neural network made in accordance with the diffractive model. This process of introducing random misalignments during the training phase is termed herein as "vaccination" of the diffractive optical neural network, and the resulting designs are sometimes referred to as "vaccinated" $D^2NNs$ (v-$D^2NNs$). To demonstrate the efficacy of the training method, diffractive network models composed of five (5) diffractive layers were trained for all-optical classification of handwritten digits, where, in the training phase, independent and uniformly distributed displacement/misalignment vectors for x, y, and z directions of each diffractive layer were used. The results indicate that the v-$D^2NN$ framework and training method enables the design of diffractive optical neural networks (i.e., the physical embodiment or manifestation of the trained v-$D^2NN$) that can maintain their object recognition performance against severe layer-to-layer misalignments, providing nearly flat blind inference accuracies within the displacement/misalignment range adopted in the training.

To experimentally demonstrate the success of v-$D^2NN$ method and devices produced by these trained methods, the two 3D-printed diffractive networks were compared to each other, each with five (5) diffractive layers that were designed for hand-written digit classification under monochromatic THz illumination ($\lambda$=~0.75 mm): the first network model was designed without the presence of any misalignments (non-vaccinated) and the second one was designed as a v-$D^2NN$. After the fabrication of each diffractive network, the $3^{rd}$ diffractive layer was on purpose misaligned to different 3D positions around its ideal location (lateral and axial misalignment). The experimental results confirmed the numerical analysis to reveal that the v-$D^2NN$ design can preserve its inference accuracy despite a wide range of physical misalignments, while the standard $D^2NN$ design frequently failed to recognize the correct data class due to these purposely-introduced misalignments.

The v-$D^2$NN training method was also combined with differential diffractive optical neural networks and the jointly-trained optical-electronic (hybrid) neural network systems were investigated. Differential diffractive classification systems assign a pair of detectors (generating one positive and one negative signal) for each data class to mitigate the strict non-negativity constraint of optical intensity, and were demonstrated to offer superior inference accuracy compared to standard diffractive designs. When trained against misalignments using the presented v-$D^2$NN framework, differential diffractive networks were shown to preserve their performance advantages for all-optical classification. However, both differential and standard diffractive networks fall short in matching the adaptation capabilities of an optical/electronic hybrid diffractive network system that uses a modest, single-layer fully-connected architecture with only 110 learnable parameters in the electronic domain, following the diffractive optical front-end (i.e., a hybrid system with an all-optical front-end and an electronic trained neural network at the back-end').

In addition to misalignment related errors, the presented vaccination methods can also be adopted to mitigate other error sources in diffractive network models, e.g., detection noise, fabrication imperfections or artifacts, provided that the approximate analytical models and the probability distributions of these factors are utilized during the training stage. V-$D^2$NNs will be the gateway of diffractive optical neural networks and the related hybrid neural network schemes may be used towards practical machine vision and sensing applications, by mitigating various sources of error between the training forward models and the corresponding physical hardware implementations.

In one embodiment, a method of forming a vaccinated diffractive optical neural network is disclosed. The vaccinated diffractive optical neural network includes a one or more of layers that are resilient to misalignments, fabrication-related errors, detector noise, and/or other sources of error. The method includes training with a computing device a diffractive optical neural network model to perform one or more specific optical functions for a transmissive and/or reflective optical neural network having a plurality of optically transmissive and/or optically reflective physical features located in different two dimensional locations in each of the one or more layers, wherein the training comprises feeding an input plane of the diffractive optical neural network model with training images or training optical signals along with random misalignments of the one or more diffractive layers, fabrication-related errors, input plane or output plane misalignments, and/or detector noise, followed by computing an optical output of the diffractive optical neural network model through optical transmission and/or reflection resulting from the optical neural network and iteratively adjusting complex-valued transmission and/or reflection coefficients for each layer until optimized transmission/reflection coefficients are obtained. A physical embodiment of the diffractive optical neural network is then manufactured that includes one or more transmissive and/or reflective layers having physical features that match the optimized transmission/reflection coefficients obtained by the trained deep neural network in training the diffractive optical neural network model. The physical embodiment is thus vaccinated against misalignments, fabrication-related errors, detector noise, and/or other sources of error.

In another embodiment, a vaccinated diffractive optical neural network is disclosed that includes one or more layers that are resilient to misalignments, fabrication-related errors, detector noise, and/or other sources of error. The vaccinated diffractive optical neural network includes one or more optically transmissive layers arranged in an optical path, each of the one or more optically transmissive layers comprising a plurality of physical features formed on or within the one or more optically transmissive layers and having different complex-valued transmission coefficients as a function of lateral coordinates across each layer, wherein the one or more optically transmissive layers and the plurality of physical features thereon collectively define a trained mapping function between an input optical image or input optical signal to the one or more optically transmissive layers and an output optical image or output optical signal created by optical diffraction through the one or more optically transmissive layers, the trained mapping function being resilient to one or more of: misalignment of one or more of the optically transmissive layers, misalignment of an input plane, misalignment of an output plane, fabrication-related errors in the optically transmissive layers and/or in the diffractive network, detector noise, and/or other sources of error. The network includes one or more optical detectors configured to capture the output optical image or output optical signal resulting from the one or more optically transmissive layers.

In another embodiment, a vaccinated diffractive optical neural network is disclosed that includes one or more layers that are resilient to misalignments, fabrication-related errors, detector noise, and/or other sources of error. The vaccinated diffractive optical neural network includes one or more optically reflective layers arranged along an optical path, each of the one or more optically reflective layers comprising a plurality of physical features formed on or within the one or more optically reflective layers, wherein the one or more optically reflective layers and the one or more physical features collectively define a trained mapping function between an input optical image or input optical signal to the one or more optically reflective layers and an output optical image or output optical signal from the one or more optically reflective layers, the trained mapping function being resilient to one or more of: misalignment of one or more of the optically transmissive layers, misalignment of an input plane, misalignment of an output plane, fabrication-related errors in the optically transmissive layers and/or the diffractive network, detector noise, and/or other sources of error. The network includes one or more optical detectors configured to capture the output optical image or output optical signal from the one or more optically reflective layers.

In some embodiments, the vaccinated diffractive optical neural network incorporates an electronic or digital trained neural network at the back-end to further improve the overall operation/performance of the vaccinated diffractive optical neural network.

Note that in some embodiments, one or more layers of the diffractive network may comprise reconfigurable features such as, for example, spatial light modulators.

BRIEF DESCRIPTION OF THE DRAWINGS

FIG. 3A Standard $D^2NN$ framework trained for all-optical classification of handwritten digits. Each detector at the output plane represents a data class. FIG. 3B Differential $D^2NN$ trained for all-optical classification of handwritten digits. Each data class is represented by a pair of detectors at the output plane, where the normalized difference between these detector pairs represents the class scores. FIG. 3C Jointly-trained hybrid (optical-electronic) network system trained for classification of handwritten digits. The optical signals collected at the output detectors are used as inputs to the electronic neural network at the back-end, which is used to output the final class scores.

FIG. 3D illustrates the vaccinated layers while FIG. 3E illustrates the non-vaccinated layers.

FIG. 4A: Standard $D^2NN$ systems trained for all-optical handwritten digit classification with and without vaccination were tested against various levels of axial misalignments, determined by $\Delta_{Z,test}$. FIG. 4B: Same as FIG. 4A, except for differential $D^2NN$ architectures. FIG. 4C: Same as FIG. 4A and FIG. 4B, except for hybrid ($D^2NN$-FC) systems comprised of a jointly-trained S-layer $D^2NN$ optical front-end and a single-layer fully-connected neural network at the electronic back-end, combined through ten (10) discrete opto-electronic detectors (see FIG. 3C). The comparison of these blind testing results reveals that as the axial misalignment increases during the training, $\Delta_{Z,tr}$, the inference accuracy of these machine vision systems decreases slightly but at the same time they are able to maintain their performance over a wider range of misalignments during the blind testing, $\Delta_{Z,test}$. FIG. 4D: Standard $D^2NN$ systems trained for all-optical handwritten digit recognition with and without vaccination were tested against various levels of lateral misalignment levels, determined by $\Delta_{test}$. FIG. 4E: Same as FIG. 4D except for differential $D^2NN$s architectures. FIG. 4F: Same as FIG. 4E and FIG. 4F, except for hybrid object recognition systems comprised of a jointly-trained 5-layer $D^2NN$ optical front-end and a single-layer fully-connected neural network at the electronic back-end, combined through ten (10) discrete opto-electronic detectors. The proposed vaccination-based training strategy improves the resilience of these diffractive networks to uncontrolled lateral and axial displacements of the diffractive layers with a modest compromise of the inference performance depending on the misalignment range used in the training phase.

FIGS. 5A-5L illustrate a comparison of different types of $D^2NN$-based object classification systems trained with the same range of misalignments. FIG. 5A: Comparison of error-free designs, $\Delta_{Z,tr}$=0.0λ, for standard (Standard $D^2NN$), differential (Differential $D^2NN$) and hybrid (Hybrid $D^2NN$) object classification systems against different levels of axial misalignments, $\Delta_{Z,test}$. FIG. 5B: Comparison of standard (Standard $D^2NN$), differential (Differential $D^2NN$) and hybrid (Hybrid $D^2NN$) object classification systems against different levels of axial misalignments when they are trained with $\Delta_{Z,tr}$=1.2λ. FIGS. 5C, 5D, 5E and FIG. 5F are same as FIG. 5B, except during the training of the diffractive models the axial misalignment ranges are determined by $\Delta_{Z,tr}$, taken as 2.4λ, 4.8λ, 9.6λ and 19.2λ, respectively. FIG. 5G Comparison of error-free designs, $\Delta_{tr}$=0.0λ, for standard (Standard $D^2NN$), differential (Differential $D^2NN$) and hybrid (Hybrid $D^2NN$) object recognition systems against different levels of lateral misalignments, $\Delta_{test}$. FIG. 5H: Comparison of standard (Standard $D^2NN$), differential (Differential $D^2NN$) and hybrid (Hybrid $D^2NN$) object classification systems against different levels of lateral misalignments when they are trained with $\Delta_{tr}$=0.53λ. FIGS. 5I, 5J, 5K and 5L are same as FIG. 5H, except the lateral misalignment ranges during the training are determined by $\Delta_{tr}$, taken as 1.06λ, 2.12λ, 4.24λ and 8.48λ, respectively.

FIG. 6A: the inference accuracy of the non-vaccinated ($\Delta_{tr}$=0.0λ) and the vaccinated ($\Delta_{tr}$>0.0λ) differential $D^2NN$ systems trained for all-optical handwritten digit recognition quantified at different levels of testing misalignment ranges. The v-$D^2NN$ framework allows the all-optical classification systems to preserve their inference performance over a large range of misalignments. FIG. 6B: same as FIG. 6A, except for hybrid ($D^2NN$-FC) systems comprised of a jointly-trained 5-layer $D^2NN$ optical front-end and a single-layer fully-connected neural network at the electronic back-end combined through ten (10) discrete opto-electronic detectors (see FIG. 3C). FIG. 6C: vaccination comparison of 3 diffractive network-based machine learning architectures depicted in FIGS. 3A-3C; $\Delta_{tr}=\Delta_{test}$.

FIG. 7A: A diffractive optical neural network that is vaccinated against misalignments. This network is vaccinated against both lateral, $\Delta_{tr}$=4.24λ, and axial, $\Delta_{z,tr}$=4.8λ, misalignments. FIG. 7B shows the location of the 3rd diffractive layer was on purpose altered throughout the measurements. Except the central location, the remaining 12 spots induce an inter-layer misalignment. FIG. 7C shows the 3D printed error-free design shown in FIG. 3E. FIG. 7D shows the 3D printed vaccinated design shown in FIG. 7A and FIG. 3D. FIG. 7E shows the schematic of the experimental setup FIG. 8A shows the experimentally measured class scores for handwritten digit '0' selected from Set 1. FIG. 8B same as FIG. 8A, except the input object is now a handwritten digit '5' selected from Set 2. The solid dot within the coordinate system shown on the left-hand side represents the physical misalignment for each case (see FIG. 7B). Incorrect inference results are noted by the dashed rectangle. Refer to FIGS. 10A, 10B and 11A, 11B for more examples of the experimental comparisons between these vaccinated and error-free diffractive designs.

FIG. 9A: The inference accuracy values of two error-free standard optical neural network designs are compared. The low-contrast standard diffractive optical neural network achieves slightly higher inference accuracy when the alignment is perfect. The high-contrast diffractive optical neural network, on the other hand, is slightly more robust against misalignments. FIG. 9B: Trained with the v-D$^2$NN framework, low-contrast models use their higher inference capacity to adapt to misalignments, consistently achieving higher classification accuracies when they are tested under misalignment.

FIG. 10A: The experimentally measured class scores for handwritten digit '0' selected from Set 2. FIG. 10B: Same as FIG. 10A, except the input object is now a handwritten digit '7' selected from Set 2. The solid dot within the coordinate system shown on the left-hand side represents the physical misalignment for each case (see FIG. 7B). Incorrect inference results are noted by the dashed rectangle.

FIG. 11A: The experimentally measured class scores for handwritten digit '2' selected from Set 1. FIG. 11B Same as FIG. 11A, except the input object is now a handwritten digit '3' selected from Set 2. The solid dot within the coordinate system shown on the left-hand side represents the physical misalignment for each case (see FIG. 7B). Incorrect inference results are noted by the dashed rectangle.

FIGS. 13A-13L: Direct comparison of blind inference accuracies achieved by standard, differential and hybrid diffractive network systems for the classification of phase-encoded fashion products. Same as the FIGS. 5A-5L, except, the image dataset is Fashion-MNIST. Unlike amplitude encoded MNIST images at the input plane, the fashion products were assumed to represent phase-only targets at the object/input plane with their phase values restricted between 0 and $\pi$.

DETAILED DESCRIPTION OF ILLUSTRATED EMBODIMENTS

Figure 1A:
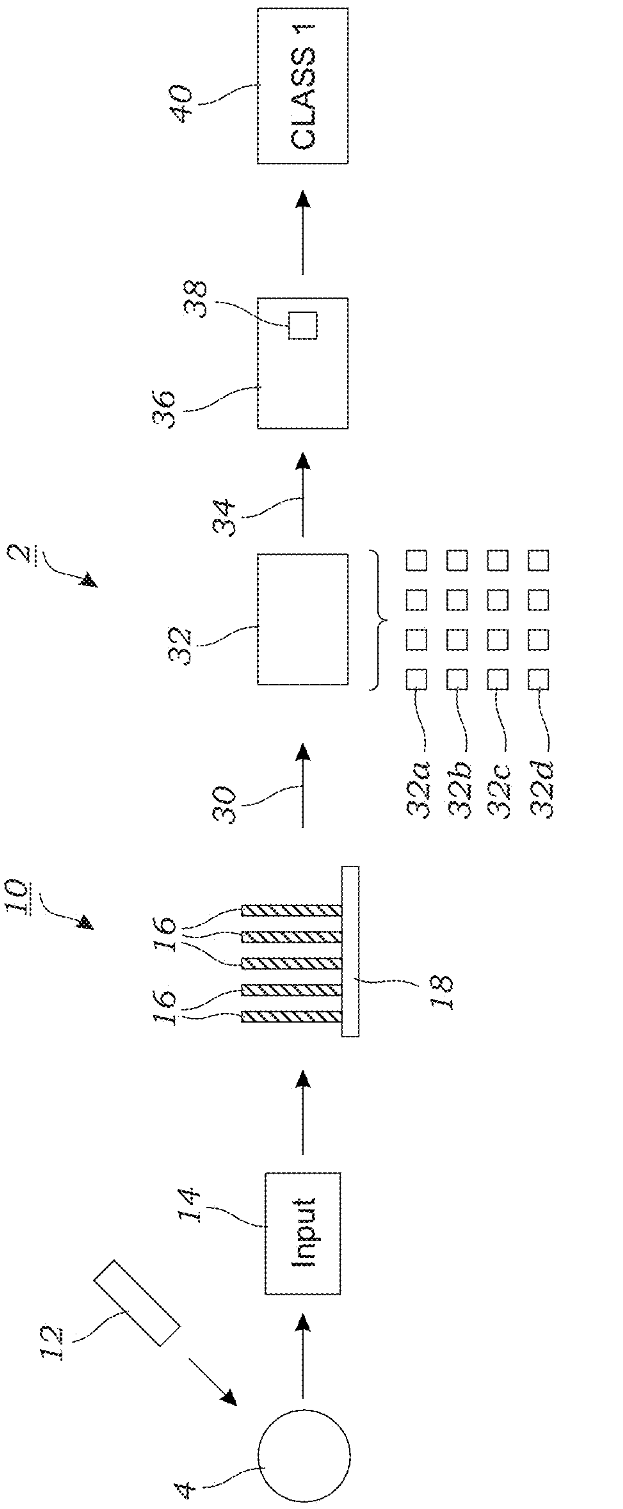
FIG. 1A illustrates one embodiment of a system that uses a multi-layer diffractive optical neural network. In this embodiment, the system is used to classify an object (or an image of the object).
Figure 1B:
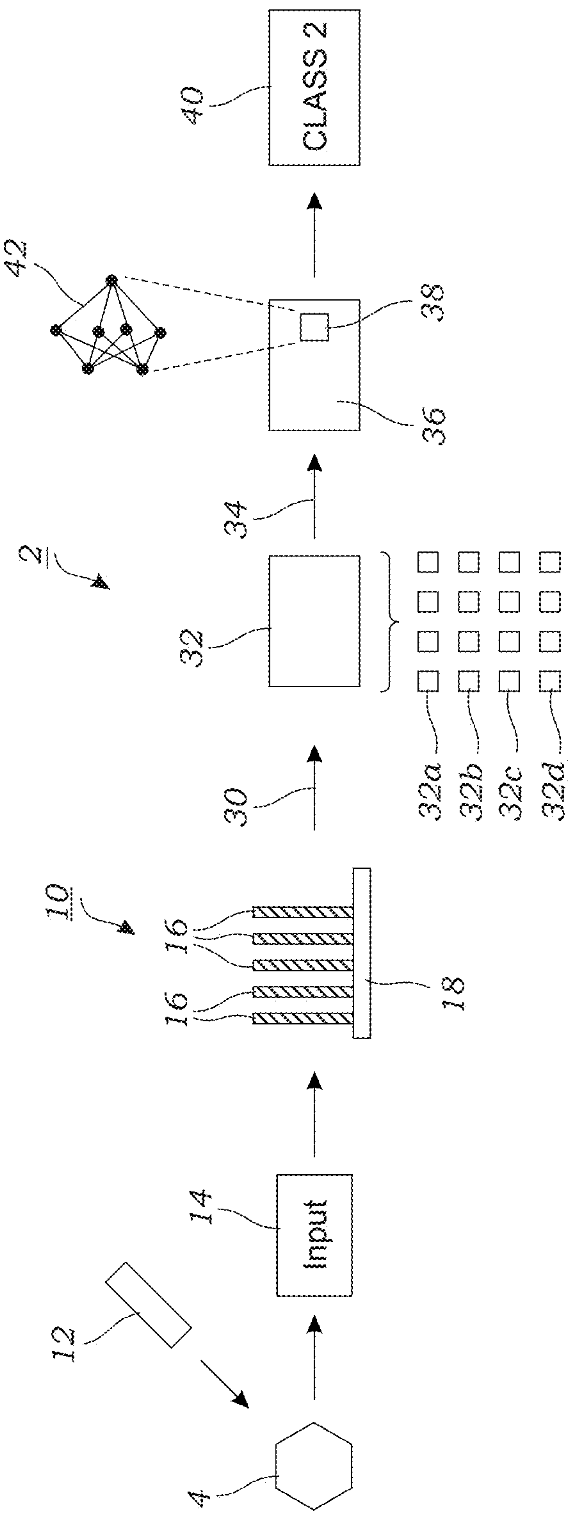
FIG. 1B illustrates another embodiment of a system that uses a multi-layer diffractive optical neural network. In this embodiment, a front-end multi-layer diffractive optical neural network is used in combination with a trained electronic neural network at the back-end which is used to improve the classification results.

FIGS. 1A-1E illustrate different embodiments of a system 2 that uses a vaccinated diffractive optical neural network 10. The diffractive optical neural network 10 may be used, in some embodiments, to performing one or more of a machine vision task, machine learning task, and/or classification of one or more objects 4, and/or processing (separately or combinations thereof) of at least one optical image, optical signal, or optical data (e.g., optically encoded data). The diffractive optical neural network 10 is used with, in some embodiments, a light source 12 that is used to illuminate the object 4. The object 4 may be macro-sized (i.e., large such as those visible without magnification) in some embodiments. In other embodiments, for example, for microscopic applications, the object 4 may be very small (e.g., microscopic). The light source 12 may, in some embodiments, include a natural light source (e.g., sunlight). The light source 12 may also include an artificial light source such as a laser, light bulb, light emitting diode(s) (LED), laser diode(s), and the like. In some instances, the light source 12 may be filtered prior to illuminating the object 4. The light source 12 that illuminates the object 4 may include visible light (e.g., light with a wavelength in the range of about 380 nm to about 740 nm) as well as light outside the perception range of humans. For example, the wavelength operating range may extend beyond the visible perception range of humans (e.g., from about 300 nm to about 1,000 nm). The light source 12 may also emit light within the ultra-violet, visible, infrared, terahertz, millimeter, or radio portion of the electromagnetic spectrum.

Illumination of the object 4 by the light source 12 may transmit through the object 4, reflect off the object 4, or combinations thereof. FIG. 1A illustrates a light source 12 reflecting off an object 4. In some embodiments, the object 4 may emit its own light in which case the light source 12 is not needed. The light from the object 4 then creates an input 14 to the diffractive optical neural network 10. While FIGS. 1A-1E illustrates light from an object 4 that forms the input 14 to the diffractive optical neural network 10, an optical signal containing data may also be used as the input 14 in some alternative embodiments. The input 14 enters the diffractive optical neural network 10. The diffractive optical neural networks 10 described herein may be used for machine learning, classification, and/or processing (separately or combinations thereof) of at least one optical image, optical signal, or optical data (e.g., optically encoded data). As seen in FIG. 1A, an optical input 12 is input to the diffractive optical neural network 10. The optical input 12 may include an optical image, optical signal, or optical data as described herein. This may include, for example, images of one or more objects that are then classified by the diffractive optical neural network 10. In some embodiments, the optical input 14 may include an image including one or more objects 4 therein. For example, an optical image 14 may be generated when a source of light 12 directs light onto an object 4 (or multiple objects 4) which reflects off (or is transmitted through) and is directed through the diffractive optical neural network 10. The object(s) 4 may also emit their own optical signal (e.g., emit fluorescence light) that result in the input 14. The object(s) 4 may be macro-sized (i.e., large such as those visible without magnification) in some embodiments. In other embodiments, for example, for microscopic applications, the object(s) 4 may be very small (e.g., microscopic). Optical images may also be captured by a front-end camera or optical device and projected through the diffractive optical neural network 10 as the input 14.

The diffractive optical neural network 10 contains one or more optically transmissive and/or reflective layers 16 arranged in one or more optical paths. When multiple such layers 16 are included in the diffractive optical neural network 10 it is a multi-layer diffractive optical neural network 10. In some embodiments, there are a plurality of layers 16 while in other embodiments may only have a single such layer. The one or more layers 16 are formed as a physical substrate or matrix of optically transmissive material (for transmission mode such as illustrated in FIG.

1A) or optically reflective material (for reflective mode). Combinations of optically transmissive and optically reflective layers 16 may also be used. FIG. 1A illustrates layers 16 in transmission mode where light or optical radiation transmits and diffracts through the layers 16. Exemplary materials that may be used for the layers 16 include polymers and plastics (e.g., those used in additive manufacturing techniques such as 3D printing) as well as semiconductor-based materials (e.g., silicon and oxides thereof, gallium arsenide and oxides thereof), crystalline materials or amorphous materials such as glass and combinations of the same. In some embodiments, one or more layers 16 of the diffractive optical neural network 10 may comprise reconfigurable features such as, for example, spatial light modulators. That is to say the layers 16 of the optical may include reconfigurable regions within or on the layers 16 using, for instance, spatial light modulators.

Each layer 16 of the diffractive optical neural network 10 has a plurality of physical features 20 (FIG. 2) formed on the surface of the layer 16 or within the layer 16 itself that collectively define a pattern of physical locations along the length and width of each layer 16 that have varied complex-valued transmission coefficients (or varied complex-valued transmission reflection coefficients). The physical features 20 formed on or in the layers 16 thus create a pattern of physical locations on or within the layers 16 that have different complex-valued transmission coefficients as a function of lateral coordinates (e.g., length and width and in some embodiments depth) across each layer 16. In some embodiments, each separate physical feature 20 may define a discrete physical location on the layer 16 while in other embodiments, multiple physical features 20 may combine or collectively define a physical region with a particular complex-valued transmission coefficient. These locations or regions on or in the layers 16 form pixel or neuron-like regions that alter of affect the light that transmits/reflects therethrough or therefrom.

The one or more layers 16 that are arranged along the optical path collectively define a trained mapping function between the input 14 (e.g., optical signal) to the one or more layers 16 and an output optical signal 30 is created by optical diffraction through the one or more layers 16 (or reflection from the layers 16). The pattern of physical locations formed by the physical features 20 may define, in some embodiments, an array located across the surface of the layer 16. Additional details regarding the layers 16 and physical features 20 that are formed thereon may be found in International Patent Application Publication No. WO 2019/200289, which is incorporated herein by reference.

Figure 2:
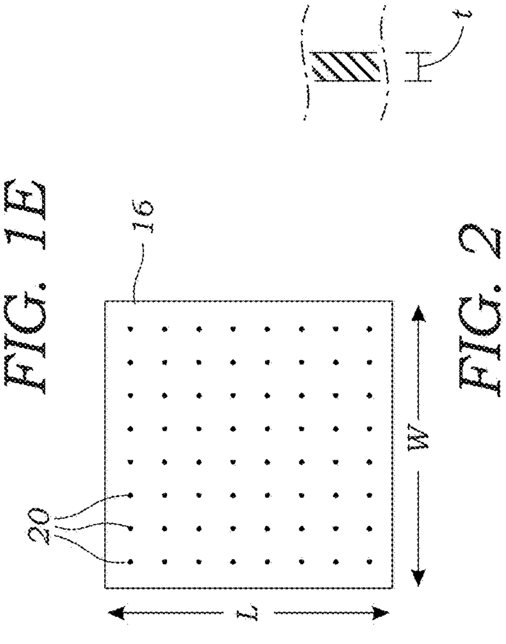
FIG. 2 illustrates a single layer of the diffractive optical neural network showing a plurality of physical features formed thereon that collectively define a pattern of physical locations along the length and width of each layer that have varied complex-valued transmission coefficients (or varied complex-valued transmission reflection coefficients). This may be accomplished by varying the thickness (t) of the substrate or material making up the layer at different locations along the layer.

As seen in FIG. 2, the layer 16 in one embodiment is a two-dimensional generally planer substrate or matrix material having a length (L), width (W), and thickness (t) that all may vary depending on the particular application. In other embodiments, the layer 16 may be non-planer such as, for example, curved. The physical features 20 and the physical regions formed thereby act as artificial "neurons" that connect to other "neurons" of other layers 16 of the diffractive optical neural network 10 through optical diffraction (or reflection) and alter the phase and/or amplitude of the light wave. The particular number and density of the physical features 20 and the artificial neurons that are formed thereby in each layer 16 may vary depending on the type of application. In some embodiments, the total number of artificial neurons may only need to be in the hundreds or thousands while in other embodiments, hundreds of thousands or millions of neurons or more may be used.

In one embodiment, the different thicknesses (t) modulates the phase of the light passing through the layer(s) 16. This type of physical feature may be used, for instance, in the transmission mode embodiment. The different thicknesses of material in the layer 16 forms a plurality of discrete "peaks" and "valleys" that control the complex-valued transmission coefficient of the neurons formed in the layer 16. The different thicknesses of the layer 16 may be formed using additive manufacturing techniques (e.g., 3D printing) or lithographic methods utilized in semiconductor processing. This includes well-known wet and dry etching processes that can form very small lithographic features on a substrate or matrix material. Lithographic methods may be used to form very small and dense physical features on the layer 16 which may be used with shorter wavelengths of the light.

Alternatively, the complex-valued transmission function of a neuron can also be engineered by using metamaterial or plasmonic structures. Combinations of all these techniques may also be used. In other embodiments, non-passive components may be incorporated in into the layers 16 such as spatial light modulators (SLMs). SLMs are devices that imposes spatial varying modulation of the phase, amplitude, or polarization of a light. SLMs may include optically addressed SLMs and electrically addressed SLM. Electric SLMs include liquid crystal-based technologies that are switched by using thin-film transistors (for transmission applications) or silicon backplanes (for reflective applications). Another example of an electric SLM includes magneto-optic devices that use pixelated crystals of aluminum garnet switched by an array of magnetic coils using the magneto-optical effect. Additional electronic SLMs include devices that use nanofabricated deformable or moveable mirrors that are electrostatically controlled to selectively deflect light.

The light or optical radiation that forms the input optical signal 14 is directed through the layers 16 of the diffractive optical neural network 10 along an optical path (or in other embodiments along multiple optical paths). The layers 16 are held within a holder 18 (e.g., mount, housing, or the like) that maintain the various layers 16 in a fixed state whereby the various layers are separated from one another. The actual number of layers 16 that collectively defined the diffractive optical neural network 10 may vary but is typically one (1) or more and less than ten (10), but may vary. In certain embodiments, there are a plurality of layers 16 that are used (i.e., multiple layers 16) such as that disclosed herein in the experimental results. The particular spacing of the layers 16 that make the vaccinated diffractive optical neural network 10 may be maintained using the holder 18. The holder 18 may contact one or more peripheral surfaces of the layers 16. In some embodiments, the holder 18 may contain a number of slots that provide the ability of the user to adjust the spacing between adjacent layers 16. A single holder 18 can thus be used to hold different diffractive optical neural networks 10. In some embodiments, the layers 16 may be permanently secured to the holder 18 while in other embodiments, the substrate layers 16 may be removable from the holder 18. Even though the substrate layers 16 may be securely held within the holder 18, misalignment of the layers 16 may occur during fabrication or manufacturing as the substrate layers 16 are secured to or otherwise held by the holder 18. Alternatively, misalignment may result from use of a system 2 that includes the vaccinated diffractive optical neural network 10. For example, the diffractive optical neural network 10 may be used in an environment that subjects the diffractive optical neural network 10 to movement, vibrations, or other forces that can cause misalignment of the layers 16 within the holder 18. Advantageously, the performance of the vaccinated diffractive optical neural network 10 can, however, still be maintained given the resilient nature of the design and training of the vaccinated diffractive optical neural network 10.

As explained herein, the design or physical embodiment of the diffracted optical neural network 10 is vaccinated during the design phase by modeling the undesired layer-to-layer misalignments in the layers 16. The layer-to-layer misalignments may include misalignments in the lateral direction (e.g., x, y direction), misalignments in the axial direction (e.g., z direction) as well as in-plane rotational misalignment of the layers 16. Misalignment may also include misalignment of the input plane and/or output plane. The same vaccination process may also be used to correct for fabrication-related errors or artifacts introduced as part of the manufacturing process (e.g., 3D printing). This vaccination process models the light transmission/reflection through/from the layers 16 as continuous random variables in the optical forward model. This results in designs for physical diffractive optical neural networks 10 that are trained to maintain their inference accuracy over a large range of misalignments. In one embodiment, the physical embodiment of the diffractive optical neural network 10 has an inference performance that substantially equals the inference performance of an equivalent diffractive optical neural network 10 that does not have any misalignments, fabrication-related errors, and/or other sources of error taken into account during training.

The output optical signal 30 is captured by a detector 32 or set of detectors 32. The detector 32 or set of detectors 32 is configured to sense the output optical signal(s) 30 from the diffractive optical neural network 10. In one embodiment, the multiple separate detectors 32, for example, a set of detectors 32, may be used to output optical signals 30. In one particular embodiment, a single detector 32 or a sub-set of detectors 32 (e.g., a pair) are uniquely assigned to a particular classification or task that is to be performed by the system 2. For example, FIG. 1A shows an array of sixteen (16) detectors 32. Each of these individual detectors 32 may correspond to a particular classification or task (e.g., detectors 32*a*, 32*b*, 32*c*, 32*d*). For example, one of these detectors 32*a* may correspond to “Class 1” which is used to classify the object 4. Of course, multiple sub-groupings of detectors 32 may be assigned to a particular classification or task to be performed by the diffractive optical neural network 10.

The detector 32 may include CCD detectors, photomultiplier tube (PMT), photodiodes (e.g., photodiode such as avalanche photodiode detector (APD)), photodetectors, photomultiplier (PMT) devices, multiple image sensors, and the like. The optical sensors 32 may also include individual pixels or a collection of pixels found in in CCD or CMOS image sensors. In some embodiments, an aperture output array (not shown) may be interposed between the output from the diffractive optical neural network 10 and the detector(s) 32. The apertures may correspond, for example, to different classifications. In some embodiments, a single detector 32 is used to capture the output optical signal(s) 30. In some embodiments, the single detector 32 may be moved to different locations using a stage or the like to capture signals at different locations (e.g., signal passing through apertures of aperture output array). The detector 32 or set of detectors 32 generates output signals, images, or data 34 that used to perform the machine vision task, machine learning task, and/or classification of objects 4. The output signals, images, or data 34 may be used directly or indirectly to perform the desired task or classification. As seen in FIG. 1A, an optional computing device 36 is provided that receives the output signals, images, or data 34 from the detector 32 or set of detectors 32 and, using software 38 that is executed thereon, uses the output signals, images, or data 34 to output and/or perform the designed task 40. The task 40 that is performed by the system 2 may include a machine vision task, machine learning task, and/or classification of objects 4. In this particular example, the task 40 is the classification of the object 4 (classified as Class 1). In other embodiments, the computing device 36 is not needed and the output signals, images, or data 34 form the detector 32 or set of detectors 32 directly can be used for the particular task 40 to be performed.

The optional computing device 36 may be used to run software 38 that receives/transmits signals and/or data from/to the detector 32 or set of detectors 32. The computing device 36 may include a computer or the like such as a personal computer, laptop, server, mobile computing device. The computing device 36 may run software 38 that performs a number of functions via one or more processors. This includes, for example, perform object classification or object typing. In some embodiments, the computing device 36 may run or execute a trained neural network 42 such as that illustrated in FIG. 1B. The trained neural network 42 may operate within the software 38 or it may be separate therefrom. For example, the trained neural network 42 may be implemented on Python or TensorFlow software as examples.

Figure 1C:
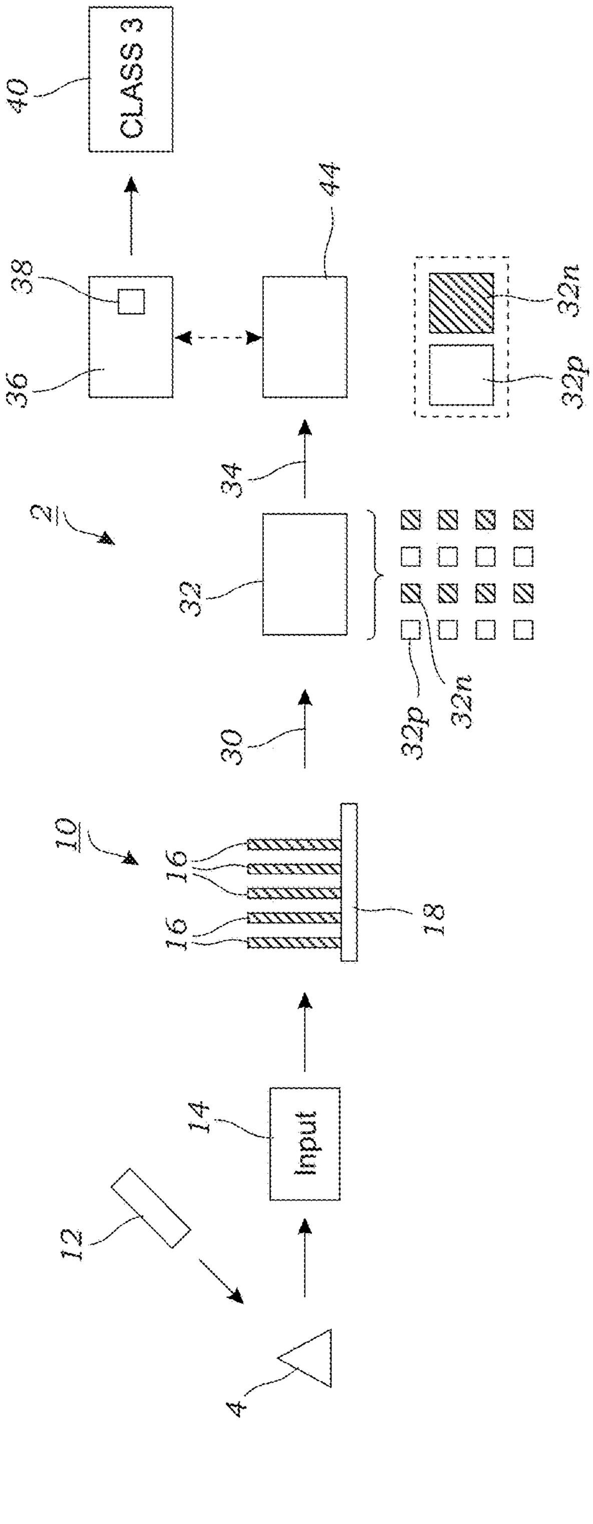
FIG. 1C illustrates another embodiment of a system that uses a multi-layer diffractive optical neural network that uses a differential configuration. Each data class is represented by a pair of detectors (or other groupings) at the output plane, where the normalized difference between these detector pairs represents the class scores.

FIG. 1C illustrates an alternative of a system 2 that uses a diffractive optical neural network 10 with detectors 32 that perform a differential operation using sub-groups of individual detectors 32 with the overall set or group of detectors 32. Here, the detectors 32 are coupled to circuitry 44 that is used to perform a differential operation on groups of detectors 32. In particular, in one implementation, a group of detectors 32 is formed by a pair of detectors 32 with one of the detectors 32 being classified as a virtually “positive” detector 32*p* and the other detector 32 being classified as a virtually “negative” detector 32*n*. A positive detector 32*p* is a detector 32 whose output (e.g., output signal or data) is added to another optical signal or data with a positive scaling factor or coefficient. A negative detector 32*n* is a detector 32 whose output (e.g., output signal or data) is added to another optical signal or data with a negative scaling factor or coefficient.

Figure 1D:
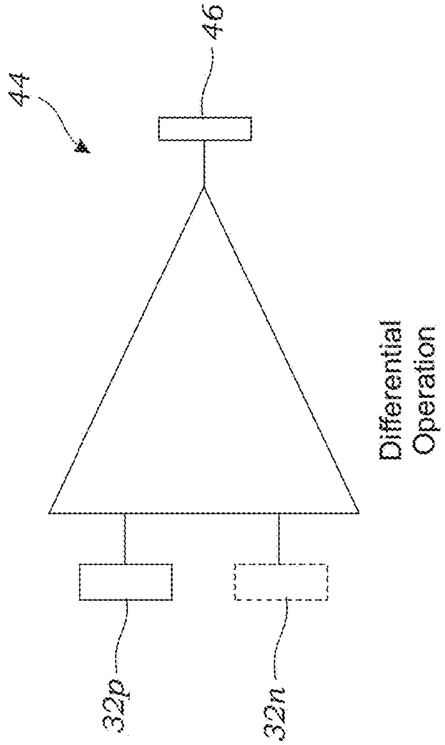
FIG. 1D illustrates circuitry that is used to perform a differential operation on groups of detectors of the embodiment of FIG. 1C.
Figure 1E:
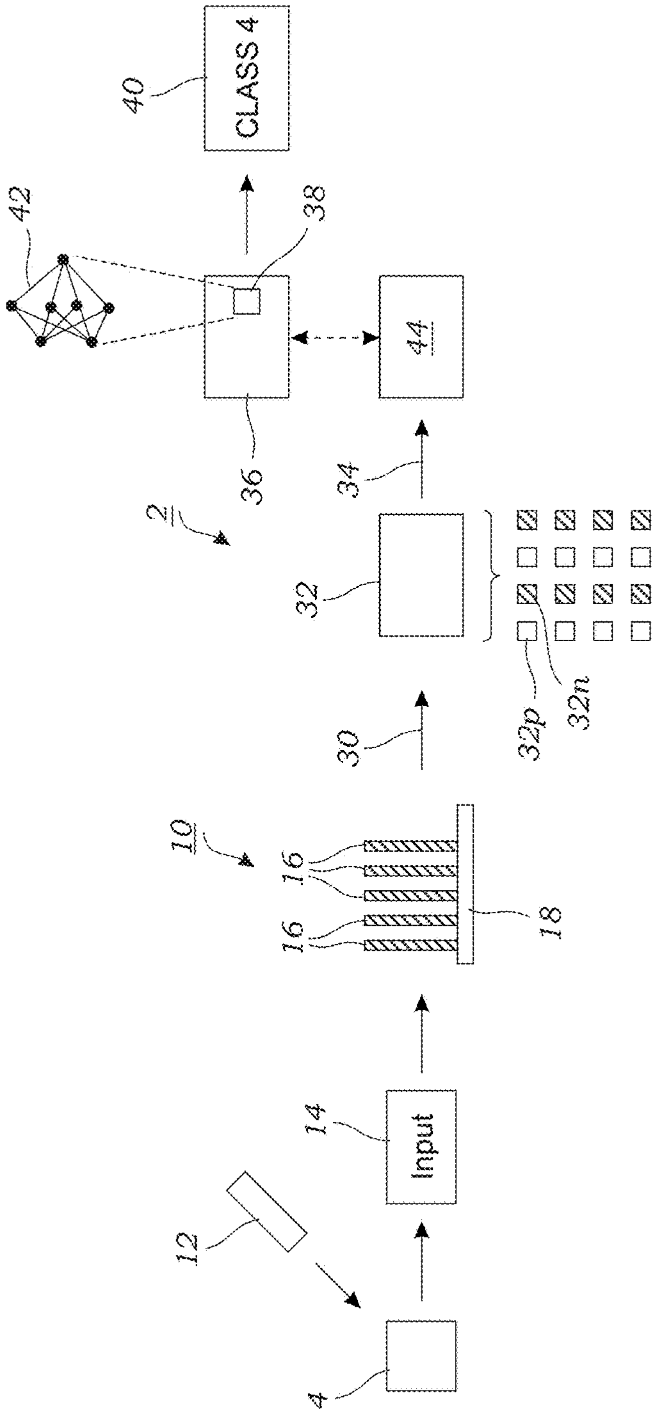
FIG. 1E illustrates another embodiment of a system that uses a multi-layer diffractive optical neural network that uses a differential configuration. This embodiment is different from that of FIG. 1C in that it is also used in conjunction with a trained electronic neural network at the back-end.

For example, FIG. 1D illustrates differential amplifier circuit 44 that is used to generate an output 46 that is the signal difference between the inputs from the negative detector 32*n* and the positive detector 32*p* within a particular group. Each group of detectors 32 include its own circuitry or hardware 44 (or share common circuitry or hardware 44 with time multiplexing of inputs) that is used to calculate the signal difference within the negative detector(s) 32*n* and positive detector(s) 32*p* making up the group (e.g., pair as illustrated in dashed box of FIG. 1C). As explained herein, in one embodiment the final task 40 is based on identifying the particular detector 32 group where the normalized signal difference is maximized. That is to say, the particular group of detectors 32 is identified that has the largest normalized signal difference. This group of detectors 32 is associated with a particular classification which is then output as the desired task 40 of the system 2. In some embodiments, the grouping may involve a pair of detectors 32 (e.g., one positive detector 32*p* and one negative detector 32*n*). Groupings, however, may encompass additional variations such as two or more positive detectors 32*p* and two or more negative detectors 32*n*.

Figure 3A:
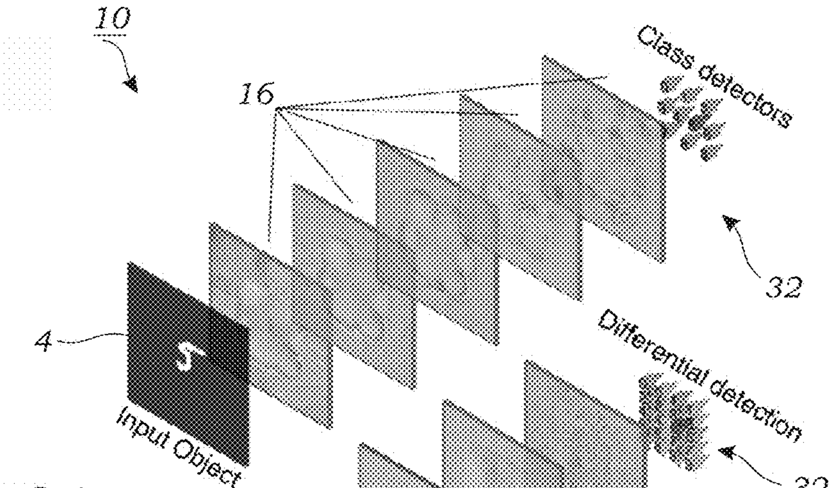
FIGS. 3A-3C illustrate different types of $D^2NN$-based image classification systems.
Figure 3B:
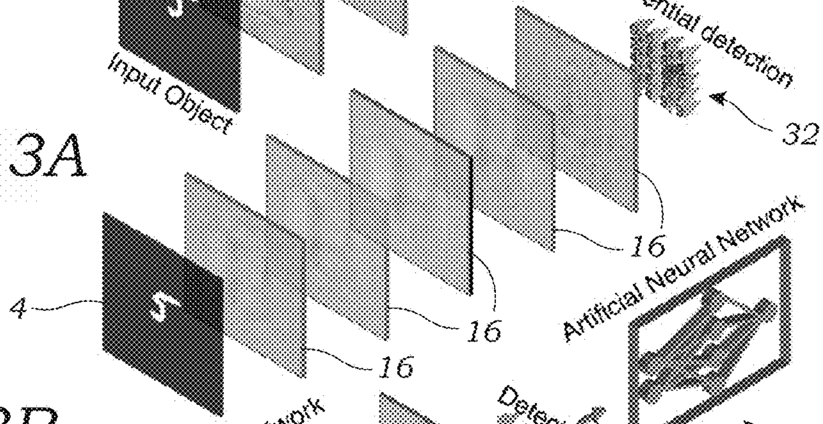
Figure 3C:
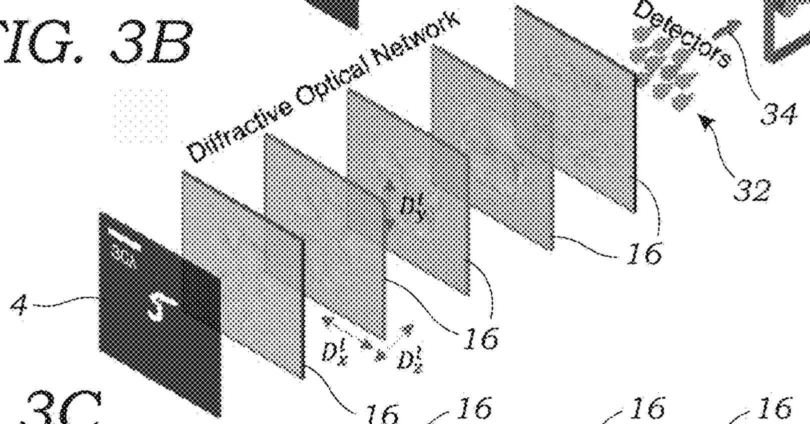

FIGS. 3A-3C illustrate different types of image classification systems 2 that utilize so-called vaccinated diffractive optical neural networks 10. FIG. 3A illustrates a standard vaccinated diffractive optical neural network 10 trained for all-optical classification of handwritten digits. Each detector 32 at the output plane (e.g., active area of detector(s)) represents a specific data class. Of course, it is possible that multiple detectors 32 could be used for a single class. FIG. 3B illustrates a differential vaccinated diffractive optical neural network 10 trained for all-optical classification of handwritten digits. Each data class is represented by a pair of detectors 32*p*, 32*n* at the output plane, where the normalized difference between these detector pairs 32*p*, 32*n* represents the class scores. FIG. 3C illustrates a jointly-trained hybrid (optical-electronic) vaccinated diffractive optical neural network 10 trained for classification of handwritten digits. The optical signals, images, or data 34 collected at the output detectors 32 or array are used as inputs to the electronic neural network 42 at the back-end, which is used to output the final class scores. FIG. 3C thus shows a hybrid embodiment that utilizes an all optical front-end and an electronic back-end.

Figure 14:
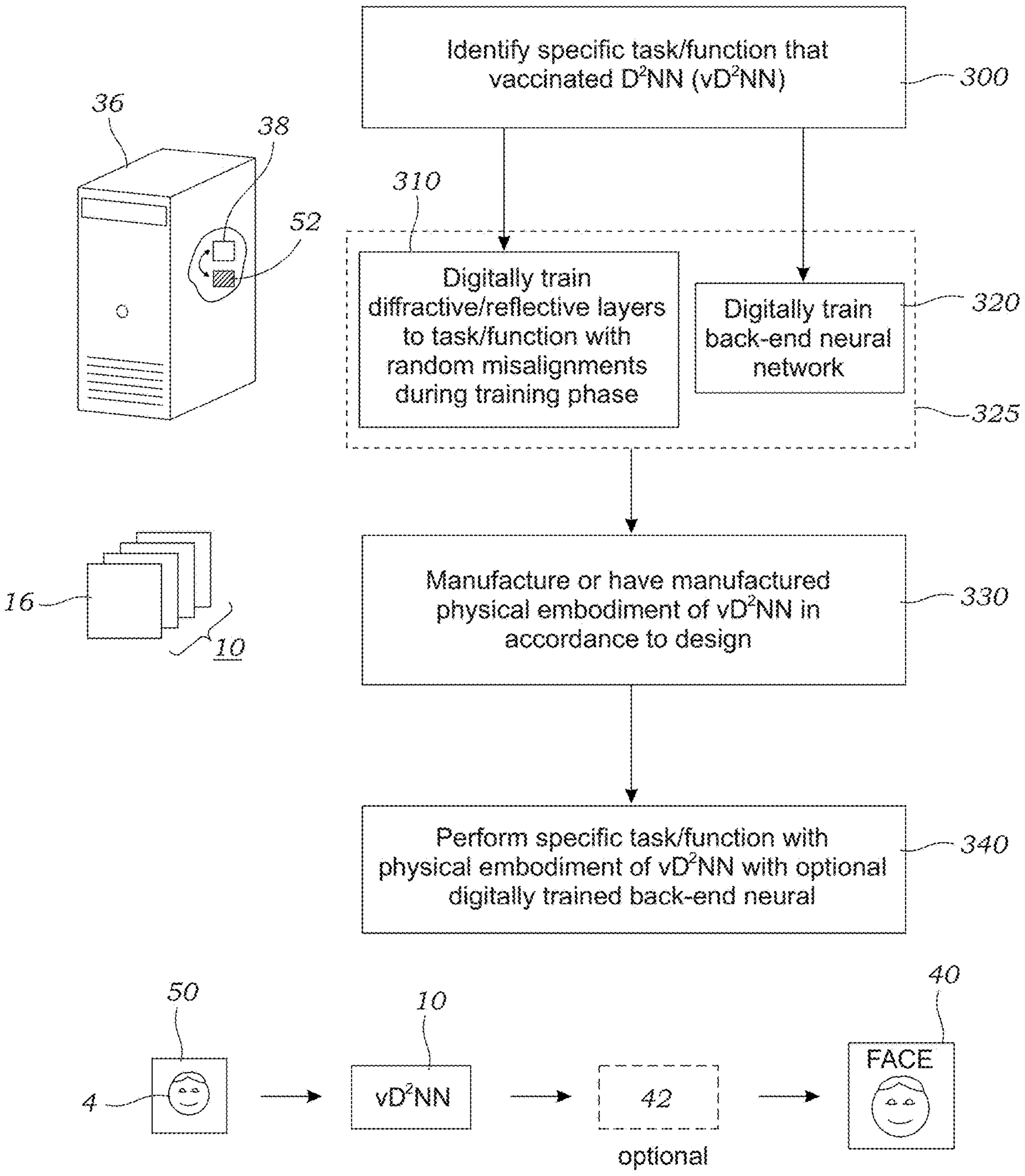
FIG. 14 illustrates a flowchart of the operations or processes according to one embodiment to create and use a vaccinated diffractive optical neural network (v-D$^2$NN).

FIG. 14 illustrates a flowchart of the operations or processes according to one embodiment to create and use a vaccinated diffractive optical neural network 10. As seen in operation 300 of FIG. 14, a specific task/function is first identified that the vaccinated diffractive optical neural network 10 will perform. This may include classification of one or more objects 4. The object 4 may be in free space or the object may be in an image (e.g., captured in an image). For example, a classification scheme may classify objects 4 within images based on one or more features. For example, the classification scheme may classify objects within images as, for example, a face or the like. The system 2 may further be used to tag or identify certain features within the classified objects 4 within an image. The task or function may also include performing one or more imaging operations (e.g., image magnification, enhance spatial features of the object 4, improved resolution, feature highlighting, image feature tagging, etc.). In the particular example illustrated in FIG. 14, the task/function is to identify objects 4 in a scene or image 50 and identify a face in the input scene or image 50 (Face ID). Once the task or function has been established, a computing device 36 having one or more processors 52 executes software 38 thereon to then digitally train a model or mathematical representation of one or more diffractive or reflective layers 16 to the desired task or function to then generate a design for a physical embodiment of the vaccinated diffractive optical neural network 10. This operation is illustrated as operation 310 in FIG. 14. Importantly, in this digital training operation 310, undesired misalignments, artifacts, or errors are introduced as continuous random variables in the optical forward model that is used to design the physical features or regions in the layers 16 that collectively define the vaccinated diffractive optical neural network 10.

The design has the physical layout for the different physical features 20 that form the artificial neurons in each of the one or more layers 16 which are present in the vaccinated diffractive optical neural network 10. This may be stand-alone vaccinated diffractive optical neural network 10 such as that illustrated, for example, in FIG. 1A or it may include a hybrid design that includes an electronic back-end trained neural network 42 such as that illustrated in FIG. 1E. To this end, in some embodiments, the back-end trained electronic or digital neural network 42 is trained as seen in operation 320 using training images or training optical signals. This training is used to optimize the parameters of the neural network 42. This training operation 320 may conducted on the same or different computing device 36 described above that was used to generate the design for the front-end vaccinated diffractive optical neural network 10. Further, training the model or mathematical representation of a diffractive/reflective layer(s) 16 used in the front-end vaccinated diffractive optical neural network 10 to perform the desired task or function may be done jointly or simultaneously with the training of the back-end electronic or digital neural network 42 as illustrated in dashed line 325. Of course, in embodiments that do not utilize the electronic neural network 42, operation 320 is omitted from FIG. 14.

The design has the physical layout for the different physical features that form the artificial neurons in each of the one or more layers 16 which are present in the vaccinated diffractive optical neural network 10 may then be used to make a physical embodiment that reflects the computer-derived design. Operation 320 reflects that the design is used to manufacture or have manufactured the physical embodiment of the vaccinated diffractive optical neural network 10 in accordance with the design. The design, in some embodiments, may be embodied in a software format (e.g., SolidWorks, AutoCAD, Inventor, or other computer-aided design (CAD) program or lithographic software program) may then be manufactured into a physical embodiment that includes one or more layers 16. The physical layers 16, once manufactured may be mounted or disposed in a holder 18. The holder 18 may include a number of slots formed therein to hold the layers 16 in the required sequence and with the required spacing between adjacent layers (if needed). Once the physical embodiment of the vaccinated diffractive optical neural network 10 has been made, the vaccinated diffractive optical neural network 10 is then used to perform the specific task or function as illustrated in operation 340 of FIG. 14. This may be done with or without the optional electronic neural network 42 (illustrated by dashed lines for electronic neural network 42).

Results

FIGS. 3A-3C illustrates three different types of diffractive optical neural network-based object recognition systems 2 that were investigated. Experiments were focused on 5-layer diffractive optical neural network 10 architectures as shown in FIGS. 3A-3C that are fully-connected, meaning that the half cone angle of the secondary wave created by the diffractive features (neurons) of size, e.g., $\delta=0.53\lambda$, is large enough to enable communication between all the features on two successive diffractive layers 16 that are placed e.g., $40\lambda$ apart in axial direction. On the transverse plane, each diffractive layer 16 extends from $-100\times\delta$ to $100\times\delta$ on x and y directions around the optical axis, and therefore the edge length of each diffractive surface in total is $200\times\delta$ ($\sim106.66\lambda$). With this outlined diffractive network architecture, the standard $D^2NN$ training routine updates the trainable parameters of the diffractive layers 16 at every iteration based on the mean gradient computed over a batch of training samples with respect to a loss function, specifically tailored for the desired optical machine learning application, e.g., cross-entropy for supervised object recognition systems, until a convergence criterion is satisfied. Since this conventional training approach assumes perfect alignment throughout the training, the sources of statistical variations in the resulting model are limited to the initial condition of the diffractive network parameter space and the sequence of the training data introduced to the network.

Training and Testing of v-D[2]NNs

The training of vaccinated diffractive optical neural networks 10 mainly follows the same steps as the standard D[2]NN framework; except, it additionally incorporates system errors, e.g., misalignments, based on their probability distribution functions into the optical forward model. Each orthogonal component of the undesired 3D displacement vector of each diffractive layer, $D=(D_x, D_y, D_z)$, was modelled as uniformly distributed, independent random variables as follows;

$$D_x \sim U(-\Delta_x, \Delta_x), \tag{1a}$$

$$D_y \sim U(-\Delta_y, \Delta_y), \tag{1b}$$

$$D_z \sim U(-\Delta_z, \Delta_z), \tag{1c}$$

where $\Delta^*$ denotes the shift along the corresponding axis, (*), reflecting the uncertainty in the physical assembly/fabrication of the diffractive model. During the training, the random displacement vector of each diffractive layer, D, takes different values sampled from the probability distribution of its components, $D_X$, $D_Y$ and $D_Z$, for each batch of training samples. Consequently, the location of layer l at $i^{th}$ iteration/batch, $L^{(l,i)}$, can be expressed as;

$$L^{(l,i)} = (L_x^1, L_y^1, L_z^1) + (D_x^{(l,i)}, D_y^{(l,i)}, D_z^{(l,i)}), \tag{2}$$

where the first and the second vectors on the right-hand side denote the ideal location of the diffractive layer l, and a random realization of the displacement vector, $D^{(l,i)}$, of layer l at the training iteration i, respectively. The displacement vector of each layer is independently determined, i.e., each layer of a diffractive network model can move within the displacement ranges depicted in Eq. (1) without any dependence on the locations of the other diffractive layers.

Opto-mechanical assembly and fabrication systems, in general, use different mechanisms to control the lateral and axial positioning of optical components. Therefore, the numerical investigation of the vaccination process was split into two: the lateral and axial misalignment cases. For the vaccination of diffractive optical neural network models against layer-to-layer misalignments on the transverse plane, it was assumed $D_x$ and $D_y$ are i.i.d random variables during the training, i.e., they are independent with a parameter of $\Delta_x=\Delta_y=\Delta_{tr}$, and $D_z$ was set to be 0. The axial case, on the other hand, sets $\Delta_{tr}$ to be 0 throughout the training leaving $D_z \sim (-\Delta_{(z,tr)}, \Delta_{(z,tr)})$ as the only source of inter-layer misalignments.

Following a similar path with the training, the blind testing of the presented diffractive network models updates the random displacement vector of each layer l, $D^{(l,m)}$, for each test sample m. The reported accuracies throughout the analyses reflects the blind testing accuracies computed over the 10K image test set of MNIST digits where each test sample propagates through a diffractive network model that experiences a different realization of the random variables depicted in Eq. (1) for each diffractive layer 16, i.e., there are 10K different configurations that a diffractive network model was misaligned throughout the testing stage. Furthermore, similar to the training process, during the blind testing against lateral misalignments, it was assumed that $D_x$ and $D_y$ are i.i.d random variables with $\Delta_x=\Delta_y=\Delta_{test}$, and similarly, the axial displacements or misalignments were determined by $D_z \sim (-\Delta_{(z,test)}, \Delta_{(z,test)})$.

Misalignment Analysis of all-Optical and Hybrid Diffractive Systems

Figure 4A:
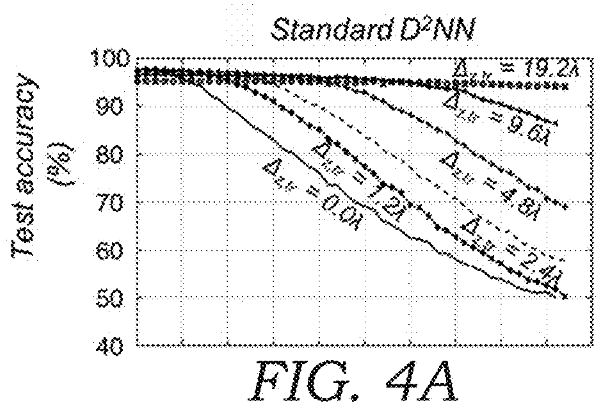
FIGS. 4A-4F illustrate the sensitivity of the blind inference accuracies of different types of $D^2NN$-based object classification systems against various levels of misalignments.
Figure 4D:
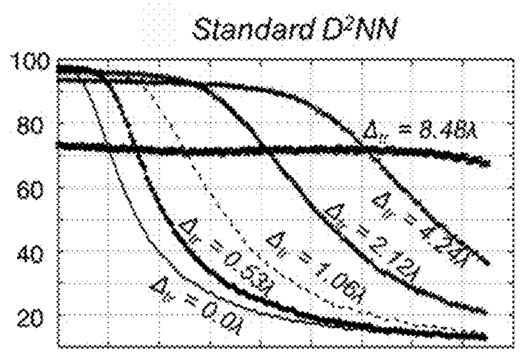

FIGS. 4A and 4D illustrate the blind testing accuracies provided by the standard diffractive optical neural network architecture (FIG. 3A) trained against various levels of undesired axial and lateral misalignments, respectively. Focusing on the testing accuracy curve obtained by the error-free design (0.0λ) in FIGS. 4A and 4D, it can be noticed that the diffractive optical neural networks are more susceptible to lateral misalignments compared to axial misalignments. For instance, when $\Delta_{test}$ is taken as 2.12λ, inducing random lateral fluctuations on each diffractive layer's location around the optical axis, the blind testing accuracy achieved by the non-vaccinated standard diffractive optical neural network decreases to 38.40% from 97.77% (obtained in the absence of misalignments). As one further increases the level of lateral misalignments, the error-free diffractive optical neural network almost completely loses its inference capability by achieving, e.g., 19.24% blind inference accuracy for $A_{test}$=4.24λ (i.e., the misalignment range in each lateral direction of a diffractive layer is −8δ to 8δ). On the other hand, when the diffractive layers are randomly misaligned on the longitudinal direction alone, the inference performance does not drop as excessively as the lateral misalignment case; for example, even when $\Delta_{(z,test)}$ becomes as large as 19.2λ, the error-free diffractive network manages to obtain an inference accuracy of 49.8%.

As demonstrated in FIG. 4D, the rapid drop in the testing accuracy of diffractive optical classification systems under physical misalignments can be mitigated by using the v-D[2]NN framework. Since v-D[2]NN training introduces displacement errors in the training stage, the diffractive optical neural networks 10 can adopt to those variations preserving their inference performance over large misalignment margins. As an example, the 38.40% blind testing accuracy achieved by the non-vaccinated diffractive design with a lateral misalignment range of $\Delta_{test}$=2.12λ, can be increased to 94.44% when the same architecture is trained with a similar error range using the presented vaccination framework (see FIG. 4D). On top of that, the vaccinated design does not compromise the performance of the all-optical object recognition systems when the ideal conditions are satisfied. Compared to the 97.77% accuracy provided by the error-free design, this new vaccinated network (2.2λ FIG. 4D) obtains 96.1% in the absence of misalignments. In other words, the ~56% inference performance gain of the vaccinated diffractive network under physical misalignments comes at the expense of only 1.67% accuracy loss when the opto-mechanical assembly perfectly matches the numerical training model. In case the level of misalignment-related imperfections in the fabrication of the diffractive network is expected to be even smaller, one can design improved v-D[2]NN models that achieve e.g., 97.38%, which corresponds to only 0.39% inference accuracy loss compared to the error-free models at their peak (perfect alignment case) while at the same time providing >4% blind testing accuracy improvement under mild misalignment, i.e., $\Delta_{test}$=0.53λ. Similarly, when one compares the blind inference curves of the error-free and vaccinated network designs in FIG. 4A, one can notice that the v-D[2]NN framework can easily recover the performance of the diffractive digit classification networks in the case where the displacement errors are restricted to be on the longitudinal axis. For example, with $A_{(z,test)}$=2.4λ, the inference accuracy of the error-free diffractive network (0.0λ) is reduced to 94.88%, while a vaccinated diffractive network that was already trained against the same level of misalignment, $A_{(z,tr)}$=2.4λ, retains 97.39% blind inference accuracy under the same level of axial misalignment.

Figure 4B:
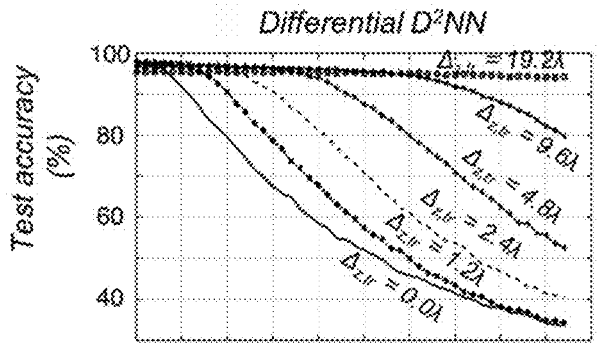
Figure 4E:
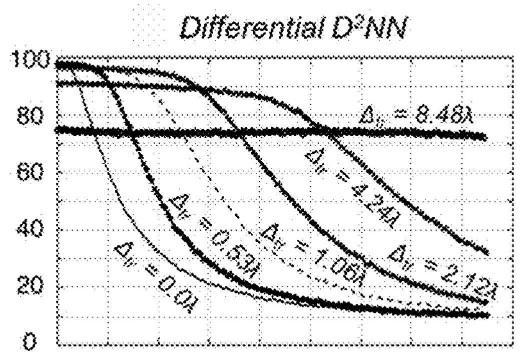
Figure 5G:
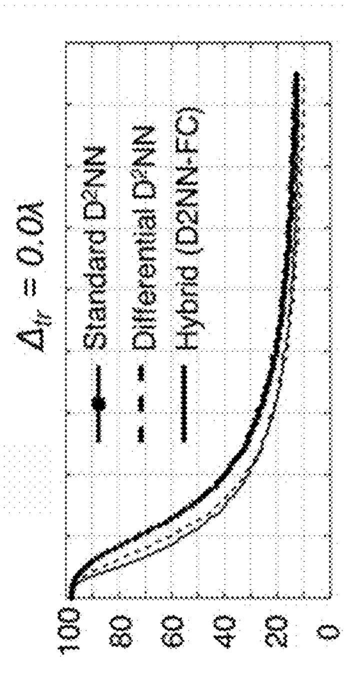
Figure 5H:
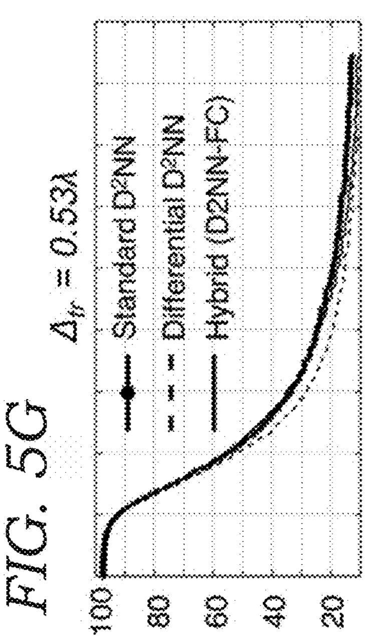
Figure 5I:
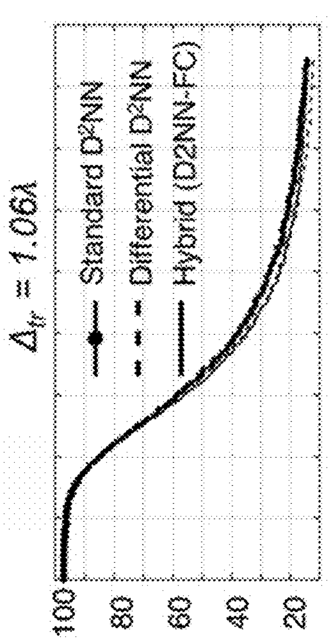
Figure 5J:
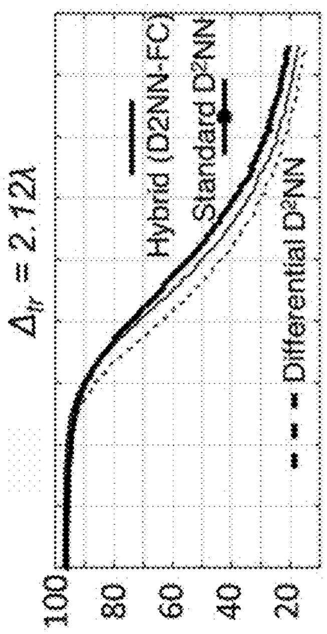
Figure 5K:
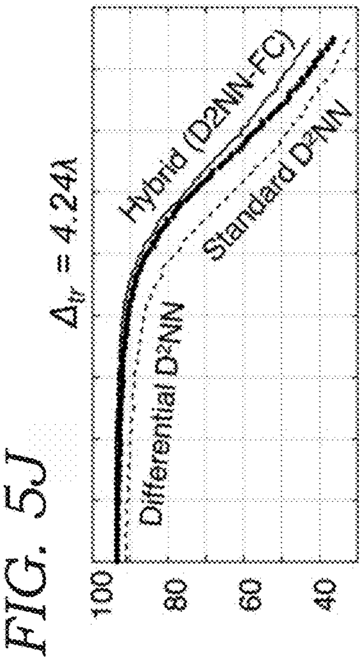

Next, the v-D$^2$NN framework was combined with the differential diffractive network architecture: the blind testing results of various differential handwritten digit recognition systems under axial and lateral misalignments are reported in FIG. 4B and FIG. 4E, respectively. FIGS. 5A-5L also provides a direct comparison of the blind inference accuracies of these two all-optical diffractive machine learning architectures under different levels of misalignments. FIGS. 5A and 5G compare the error-free designs of differential and standard diffractive network architectures, which reveal that although the differential design achieves slightly better blind inference accuracy, 97.93%, in the absence of alignment errors, as soon as the misalignments reach beyond a certain level, the performance of a differential design decreases faster than the standard diffractive network. This means that they are more vulnerable against the system variations that they were not trained against. Since the number of detectors inside an output region-of-interest is twice as many in differential diffractive networks compared to the standard diffractive network architecture (see FIGS. 3A-3B), the detector signals are more prone to have cross-talk when the diffractive layers are experiencing uncontrolled mechanical displacements. With the introduction of vaccination during the training phase, however, differential diffractive network models can adapt to these system variations as in the case of standard diffractive optical neural networks. Compared to standard diffractive optical neural networks, the differential counterparts that are vaccinated generate higher inference accuracies when the misalignment levels are small. In FIG. 5H, for instance, the vaccinated differential design (Differential D$^2$NN) achieves 97.3% blind inference accuracy while the vaccinated standard diffractive network (Standard D$^2$NN) can provide 96.91% for the case $\Delta_{test}=\Delta_{tr}$=0.53λ. In FIG. 5I, where the vaccination range on x and y axis is twice as large compared to FIG. 5H, the differential network reveals the correct digit classes with an accuracy of 96.18% when it is tested at an equal displacement/misalignment uncertainty to its vaccination level; on the other hand, the standard diffractive network can achieve 95.79% under the same training and testing conditions. Beyond this level of misalignment, the differential systems slowly lose their performance advantage and the standard diffractive networks starts to perform on par with their differential counterparts. One exception to this behavior is shown in FIG. 5K, where the misalignment range of the diffractive layers during the training causes cross-talk among the differential detectors at a level that hurts the evolution of the differential diffractive network, leading to a consistently worse inference performance compared to the standard diffractive design. A similar effect also exists for the case illustrated in FIG. 5L; however, this time, the standard diffractive optical neural network design also experiences a similar level of cross-talk among the class detectors at the output plane. Therefore, as demonstrated in FIG. 5L, the differential diffractive optical neural network recovers its performance gain thriving over the standard diffractive network design with a higher optical classification accuracy. This performance gain of the differential design depicted in FIG. 5L, can be translated to the smaller misalignment cases, e.g., $\Delta_{test}=\Delta_{tr}$=4.24λ, simply by increasing the distance between the detectors 32 at the output plane for differential diffractive optical neural network designs, i.e., setting the region-of-interest covering the detectors to be larger compared to the standard diffractive network architecture.

Figure 4C:
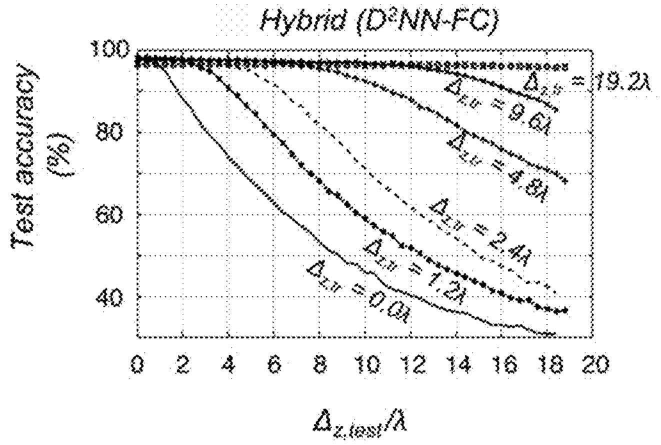
Figure 4F:
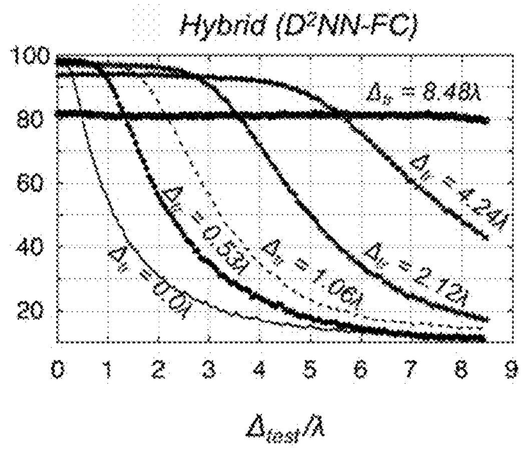
Figure 5L:
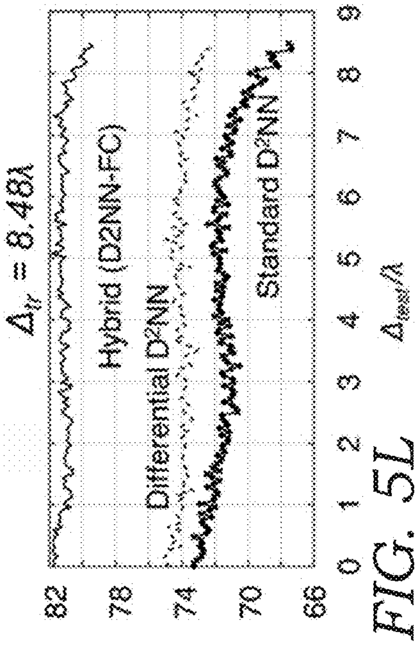

FIGS. 5A-5L also outlines a comparison of the differential and standard diffractive all-optical object recognition systems against hybrid diffractive neural networks under various levels of misalignments. For the hybrid neural network models presented here, a 5-layer diffractive optical front-end 10 and a single-layer fully-connected electronic network 42 were jointly trained, communicating through discrete detectors at the output plane. To provide a fair comparison with the all-optical diffractive systems, ten (10) discrete detectors 32 were used at the output plane of these hybrid configurations, same as in the standard diffractive optical neural network designs (see FIGS. 3A and 3C). The blind inference accuracies obtained by these hybrid neural network systems under different levels of misalignments are shown in FIGS. 4C and 4F. When the opto-mechanical assembly of the diffractive network is perfect, the error-free, jointly-optimized hybrid neural network architecture can achieve 98.3% classification accuracy surpassing the all-optical counterparts as well as the all-electronic performance of a single-layer fully-connected network, which achieves 92.48% classification accuracy using >75-fold more trainable connections without the diffractive optical neural network front-end. As the level of misalignments increases, however, the error-free hybrid network fails to maintain its performance and its inference accuracy quickly falls. The v-D$^2$NN framework helps the hybrid neural systems during the joint evolution of the diffractive and the electronic networks and makes them resilient to misalignments. For example, the handwritten digit classification accuracy values presented for the standard diffractive networks in FIG. 5H (96.91%) and FIG. 5I (95.79%) have improved to 97.92% and 97.15%, respectively, for the hybrid neural network system (Hybrid curve), indicating ~1% accuracy gain over the all-optical models under the same level of misalignment (i.e., 0.53λ for FIG. 5H and 1.06λ for FIG. 5I). As the level of misalignments in the diffractive optical front-end increases, the cross-talk between the detectors at the output plane also increases. However, for a hybrid network design there is no direct correspondence between the data classes and the output detectors 32, and therefore the joint-training under the vaccination scheme introduced herein directs the evolution of the electronic network model accordingly and opens up the performance gap further between the all-optical diffractive classification networks and the hybrid systems as illustrated in FIG. 5K and FIG. 5L. A similar comparative analysis, is also conducted for phase-encoded input objects 4 (Fashion-MNIST dataset), which is reported in FIGS. 12A-12F and 13A-13F.

Experimental Results

Figure 3D:
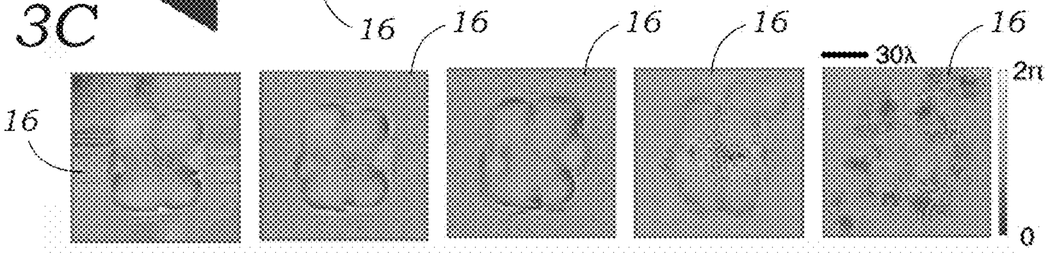
FIGS. 3D and 3E illustrate images of the layers (i.e., the physical layers).
Figure 3E:
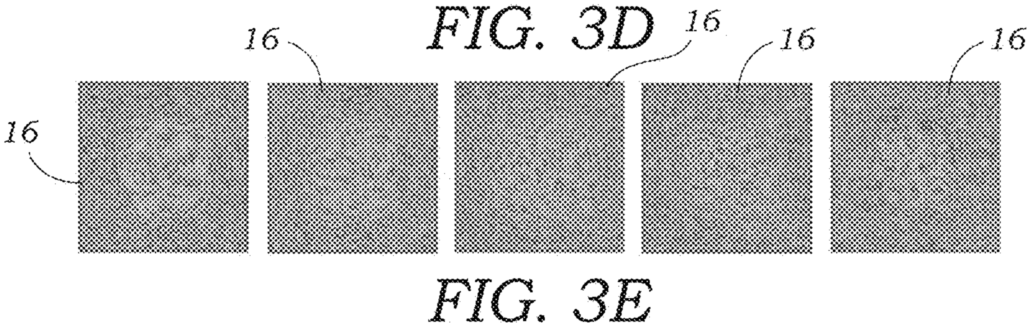

The error-free standard diffractive network design that achieves 97.77% blind inference accuracy for the MNIST dataset as presented in FIGS. 4A, 4D, 5A and 5G, offers a power efficiency of ~0.07% on average over the blind testing samples. This relatively low power efficiency is mostly due to the absorption of the 3D printing material at THz band. Specifically, ~88.62% of the optical power right after the object is absorbed by the five (5) diffractive layers 16, while 11.17% is scattered around during the light propagation. Due to the limited optical power in the THz source and the noise floor of the detector 32, an error-free standard diffractive optical neural network model was trained with a slightly compromised digit classification performance for the experimental verification of the v-D$^2$NN framework. This new error-free diffractive network provides a blind inference accuracy of 97.19%, and it obtains ~3×higher power efficiency of ~0.2%. In addition to improved power efficiency, this new diffractive network model with 97.19% classification accuracy also achieves ~10×better signal contrast (ψ) between the optical signal collected by the detector 32 corresponding to the true object label and its closest competitor, i.e., the second maximum signal. The layers 16 of this error-free diffractive network are shown in FIG. 3E. In addition, the comparison between the error-free, high-contrast standard diffractive optical neural network model and its lower contrast, lower efficiency counterpart in terms of their inference performance under misalignments is reported in FIG. 7A.

Figure 7A:
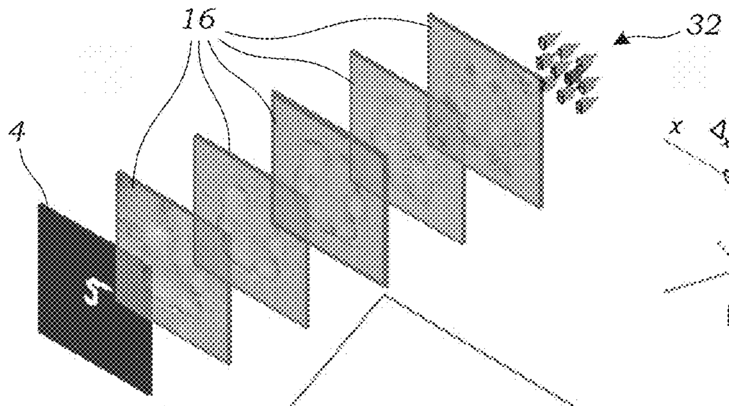
FIGS. 7A-7E illustrate the experimental testing of v-$D^2NN$ framework.

Following the same power-efficient design strategy, another diffractive optical neural network that is vaccinated against both the lateral and axial misalignments was trained with the training parameters ($\Delta_{tr}$, $\Delta_{(z,tr)}$ taken as (4.24λ, 4.8λ). As in the case of the error-free design, the inference accuracy of this new vaccinated diffractive network shown in FIG. 7A is also compromised compared to the standard diffractive networks presented in FIG. 4D and FIG. 5K since it was trained to improve power efficiency and signal contrast. This design can achieve 89.5% blind classification accuracy for handwritten digits under ideal conditions, with the diffractive layers reported in FIG. #3. A comprehensive comparison of the blind inference accuracies of the vaccinated diffractive networks shown in FIGS. 4A-4F and 5A-5L and their high-contrast, high-efficiency counterparts are reported in FIG. 9B.

The experimental verification of the v-D$^2$NN framework was based on the comparison of the vaccinated and the error-free standard diffractive optical neural network designs in terms of the accuracy of their optical classification decisions under inter-layer misalignments. To this end, the diffractive layers of the non-vaccinated and the vaccinated networks were fabricated as shown in FIGS. 3D-3 using 3D printing. The fabricated diffractive networks are depicted in FIGS. 7C-7D. In addition, 6 MNIST digits selected from the blind testing dataset that are numerically correctly classified by both the vaccinated and the non-vaccinated diffractive network models without any misalignments were fabricated. For a fair comparison, the correctly classified handwritten digits were grouped based on the signal contrast statistics provided by the non-vaccinated design. With $\mu_{sc}$, $\sigma_{sc}$ denoting the mean and the standard deviation of the signal contrast generated by the error-free diffractive network over the correctly classified blind testing MNIST digits, 2 handwritten digits (Set 1) were selected that satisfies the condition $\mu_{sc}+\sigma_{sc}<\{\psi, \psi'\}<\mu_{sc}+2\sigma_{sc}$, where ψ and ψ" denote the signal contrasts created by the error-free and the vaccinated designs for a given input object, respectively. The condition on ψ and ψ' for the second set of 3D printed handwritten digits (Set 2), on the other hand, is slightly less restrictive, $\mu_{sc}<\{\psi, \psi'\}<\mu_{sc}+\sigma_{sc}$. By using this outlined approach, 6 experimental test objects in total were selected that are equally favorable for both the vaccinated and non-vaccinated diffractive networks.

Figure 7B:
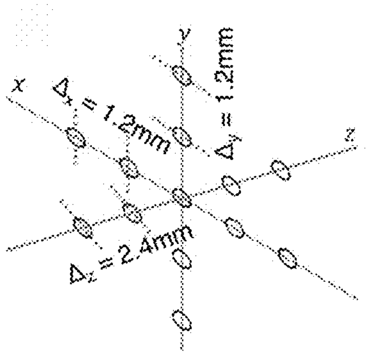
Figure 7C:
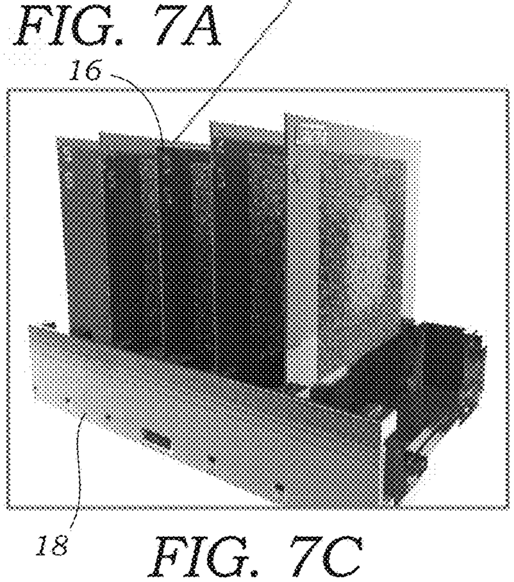
Figure 7D:
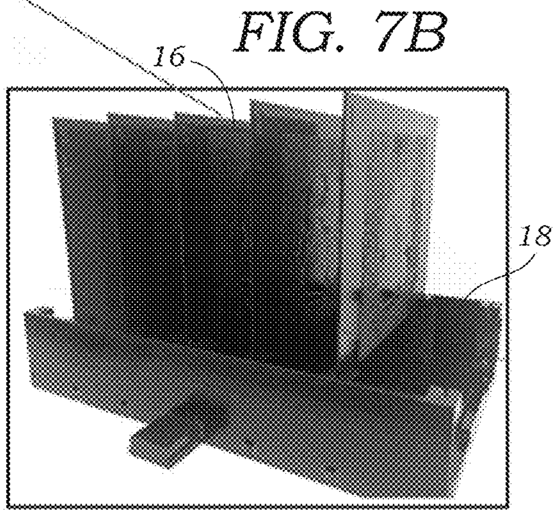

To test the performance of the error-free and vaccinated diffractive network designs under different levels of misalignments, the 3$^{rd}$ layer 16 of both diffractive systems was shifted to twelve (12) different locations around its ideal location as depicted in FIG. 7B. The perturbed locations of the 3$^{rd}$ diffractive layer 16 covers four (4) different spots on each orthogonal direction. The distances between these locations are 1.2 mm (1.6λ) along x and y, and 2.4 mm (3.2λ) along z axes. These shifts cover a total length of 6.4λ (12 times the smallest feature size) along (x,y) and 12.8λ (0.32×40λ) along z axis, respectively.

Figure 7E:
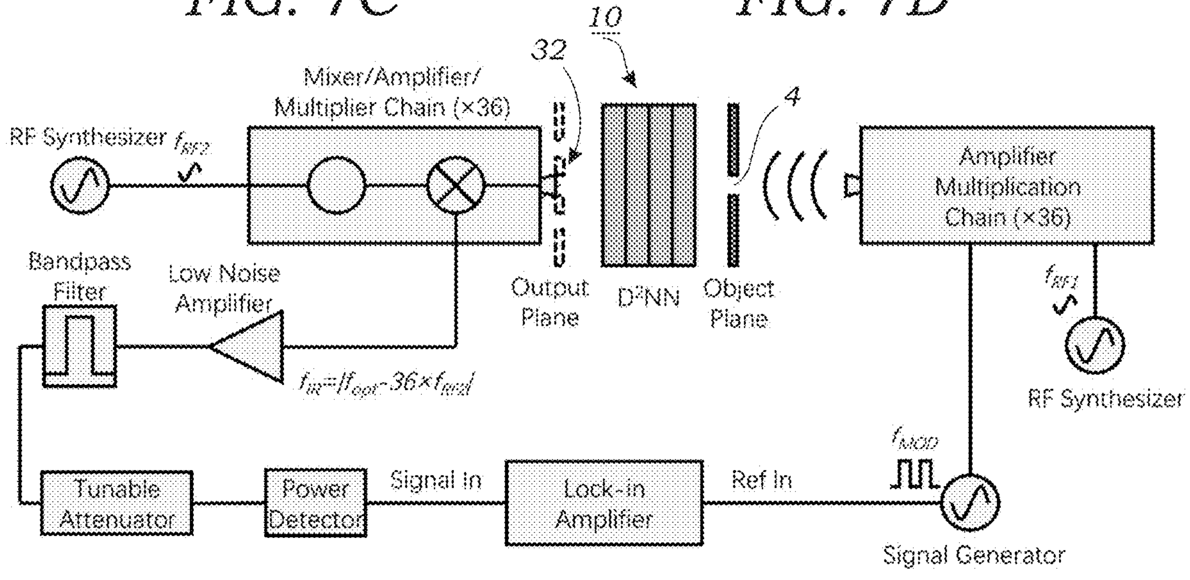
Figure 8A:
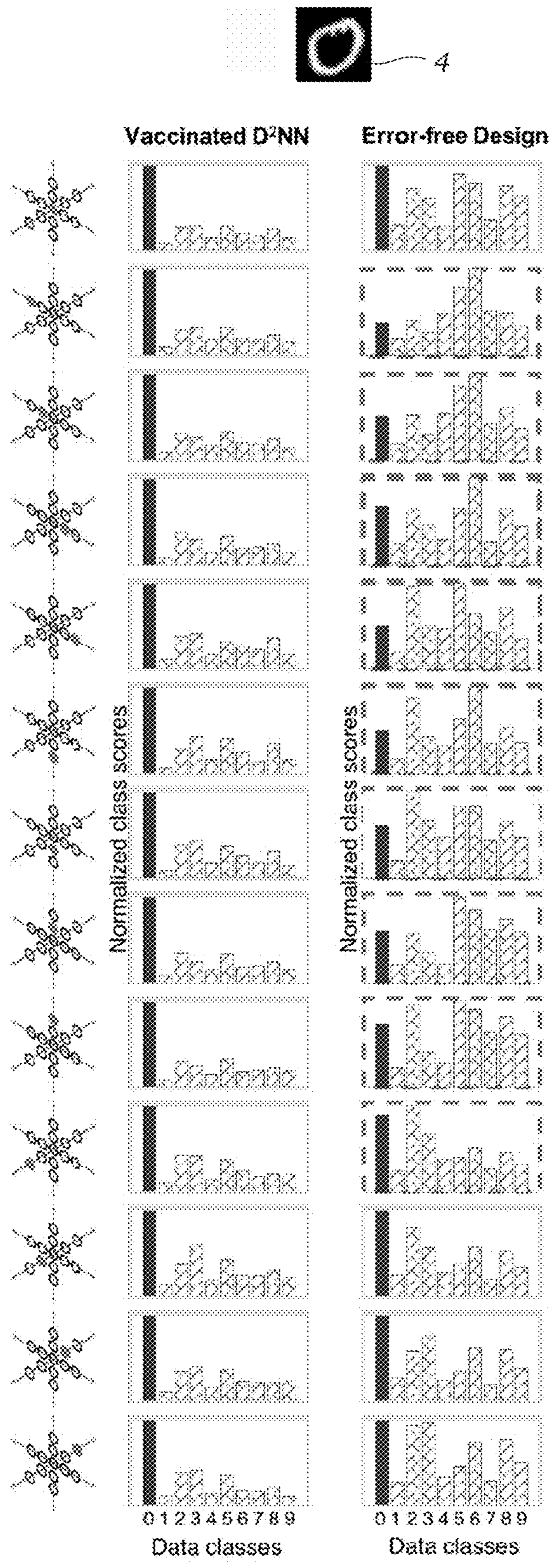
FIGS. 8A and 8B illustrate the experimental classification results as a function of misalignments.
Figure 8B:
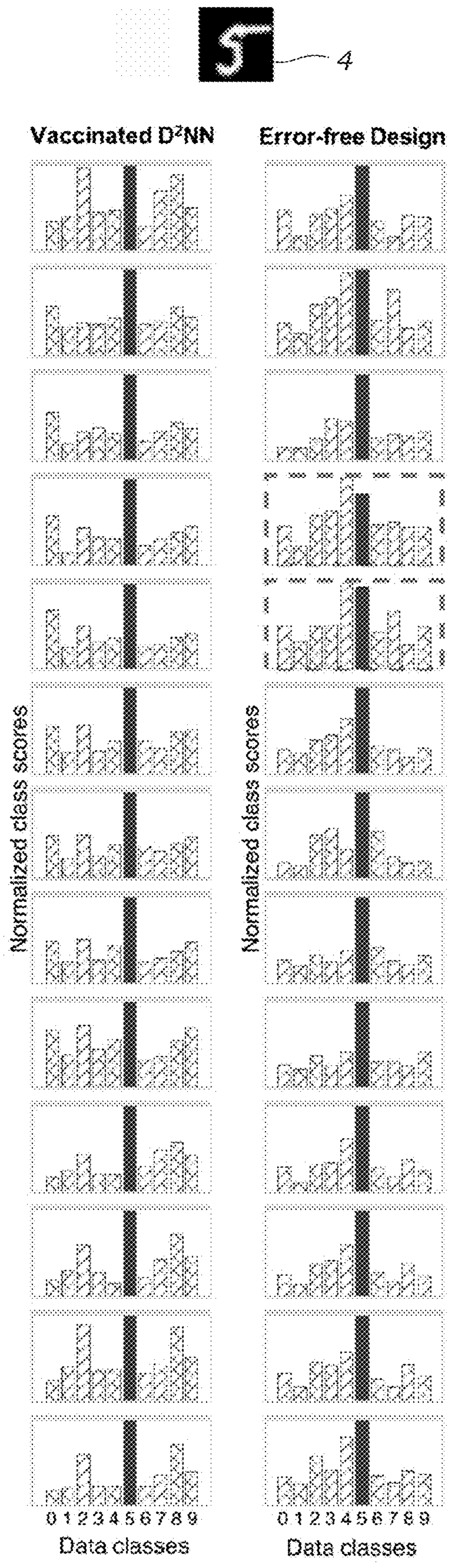

FIG. 7E shows a schematic of the THz setup that was used to test these diffractive networks and their misalignment performances. FIGS. 8A-8B reports the experimentally obtained optical signals for a handwritten digit '0' from Set 1 (FIG. 8A) and a handwritten digit '5' from Set 2 (FIG. 8B), received by the class detectors 32 at the output plane based on the thirteen (13) different locations of the 3$^{rd}$ diffractive layer 16 of the vaccinated and the error-free networks. The first thing to note is that both the vaccinated and non-vaccinated networks can classify the two digits correctly when the 3$^{rd}$ layer 16 is placed at its ideal location within the set-up. As illustrated in FIG. 8A, as one perturbs the location of the 3$^{rd}$ layer 16, the error-free diffractive network fails at nine (9) locations while the vaccinated network correctly infers the object label at all the 13 locations for the handwritten digit '0'. In addition, the vaccinated network maintains its perfect record of experimental inference for the digit '5' despite the inter-layer misalignments as depicted in FIG. 8B. The error-free design, on the other hand, fails at 2 different locations of its 3$^{rd}$ layer misalignment (see FIG. 8B). The experimental results for the remaining 4 digits are presented in FIGS. 10A, 10B and 11A, 11B, confirming the same conclusions. In the experiments, all the objects 4 were correctly classified when the 3$^{rd}$ layer 16 was placed at its ideal location. Out of the remaining 72 measurements (6 objects×12 shifted/misaligned locations of the 3$^{rd}$ layer 16), the error-free design failed to infer the correct object class in 23 cases, while the vaccinated network failed only 2 times, demonstrating its robustness against a wide range of misalignments as intended by the vaccinated multi-layer diffractive optical neural network 10 (v-D$^2$NN).

Discussion

As an example of a severe case of lateral misalignments, a scenario was investigated where each diffractive layer 16 can move within the range (−8.48λ,8.48λ) around the optical axis in x and y directions. As demonstrated in FIG. 4D and FIG. 5G, when the error-free Design (0.0λ) is exposed to such large lateral misalignments, it can only achieve 12.8% test accuracy, i.e., it barely surpasses random guessing of the object classes. A diffractive optical neural network that is vaccinated against the same level of uncontrolled layer movement can partially recover the inference performance providing 67.53% blind inference accuracy. As the best performer, the hybrid neural network system 2 composed of a 5-layer diffractive optical neural network 10 and a single-layer fully-connected network 42 can take this accuracy value up to 79.6% under the same level of misalignments, within the range (−8.48λ,8.48λ) for both x and y direction of each layer. When one compares the total allowed displacement range of each layer 16 within the diffractive network (i.e., 16.96λ in each direction) and the size of the diffractive layers (106.66λ), one can see that they are quite comparable. If one imagines a lens-based optical imaging system and an associated machine vision architecture, in the presence of such serious opto-mechanical misalignments, this system would also fail due to acute aberrations substantially decreasing the image quality and the resolution. The main motivation to include this severe misalignment case in the analyses was to test the limits of the adaptability of the vaccinated systems.

Figure 6A:
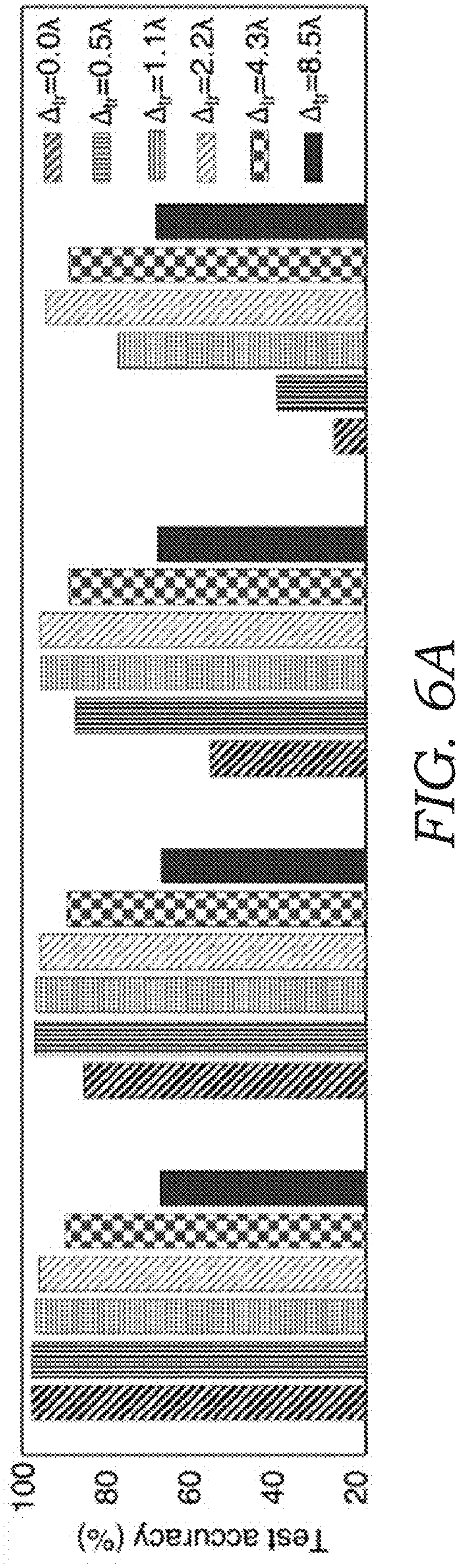
FIGS. 6A-6C illustrate a summary of the numerical results for vaccinated $D^2NN$s.
Figure 6B:
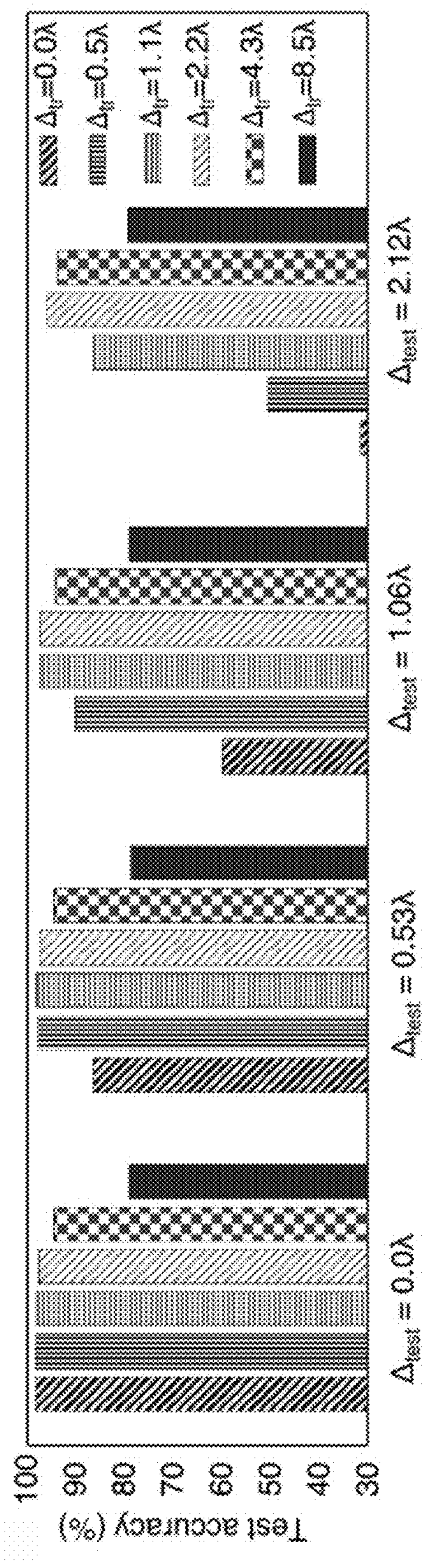
Figure 6C:
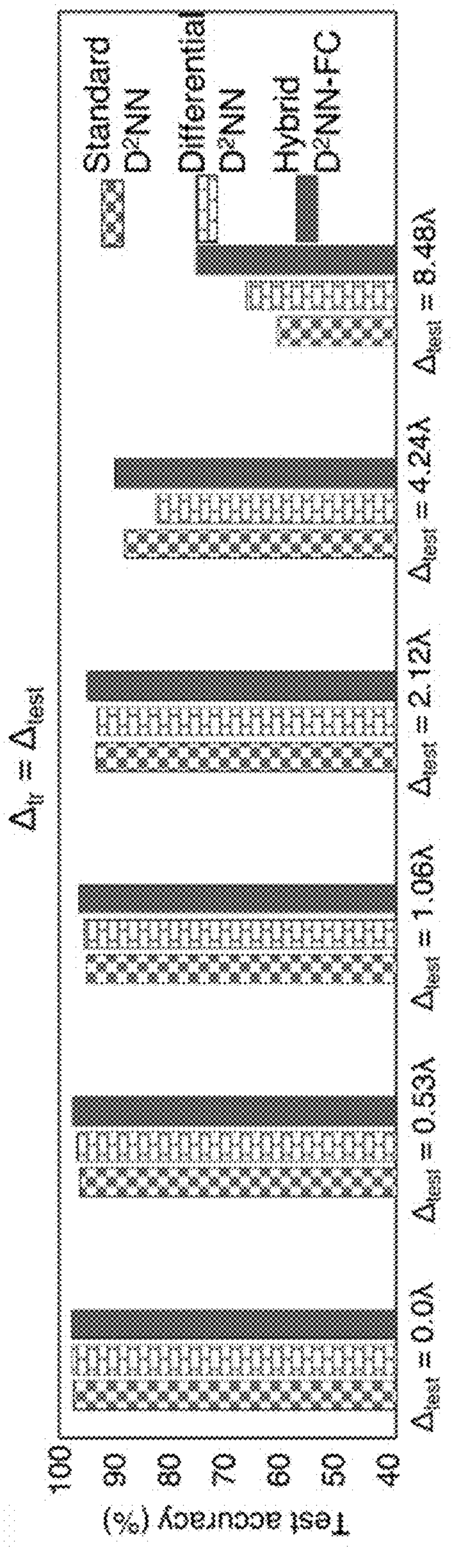

FIGS. 6A-6B further summarize the inference accuracies of the differential diffractive networks and hybrid neural network systems at discrete points sampled from the corresponding curves depicted in FIGS. 5G-5L. In FIG. 6A, the best inference accuracy is achieved by the error-free (non-vaccinated) differential diffractive network model under perfect alignment of its layers. However, its performance drops in the presence of an imperfect opto-mechanical assembly. The vaccinated, diffractive all-optical classification networks provide major advantages to cope with the undesired system variations achieving higher inference accuracies despite misalignments. The joint-training of hybrid systems that are composed of a diffractive optical front-end 10 and a single-layer electronic network 42 (back-end) can adapt to uncontrolled mechanical perturbations achieving higher inference accuracies compared to all-optical image classification systems. These results further highlight that, operating with only a few discrete opto-electronic detectors 32 at the output plane, the $D^2NN$-based hybrid architectures offer unique opportunities for the design of low-latency, power-efficient and memory-friendly machine vision systems for various applications.

A design framework is disclosed herein that introduces the use of probabilistic layer-to-layer misalignments during the training of diffractive neural networks to increase their robustness against physical misalignments. Beyond misalignments or displacements of diffractive layers 16, the presented vaccination framework can also be harnessed to decrease the sensitivity of diffractive optical neural networks to various error sources, e.g., detection noise or fabrication defects. The presented training strategy will find use in the design of diffractive optical neural network-based machine vision and sensing systems, spanning different applications.

Experimental Setup Details

The schematic diagram of the experimental setup is given in FIG. 7E. The THz wave incident on the object was generated through a horn antenna compatible with the source WR2.2 modular amplifier/multiplier chain (AMC) from Virginia Diode Inc. (VDI). Electrically modulated with 1 kHz square wave, the AMC received an RF input signal that is a 16 dBm sinusoidal waveform at 11.111 GHz ($f_{RF1}$). This RF signal is multiplied 36 times to generate the continuous-wave (CW) radiation at 0.4 THz, corresponding to ~0.75 mm in wavelength. The exit aperture of the horn antenna was placed ~60 cm away from the object plane of the 3D-printed diffractive optical neural network. At the output plane of the diffractive optical neural network, an output aperture was 3D-printed that has 10 openings, each with a size of 4.8 mm×4.8 mm, defining the class detectors at their relative locations. The diffracted THz light at the output plane was collected with a single-pixel Mixer/AMC from Virginia Diode Inc. (VDI). A 10 dBm sinusoidal signal at 11.083 GHz was sent to the detector as local oscillator for mixing, and the down-converted signal was at 1 GHz. The 10 openings representing the class detectors was scanned by placing the single-pixel detector on an XY stage that was built by combining two linear motorized stages (Thorlabs NRT100). The scanning step size was set to be 1 mm within each aperture opening. The down-converted signal of single-pixel detector at each scan location was sent to low-noise amplifiers (Mini-Circuits ZRL-1150-LN+) to amplify the signal by 80 dBm and a 1 GHz (+/−10 MHz) bandpass filter (KL Electronics 3C40-1000/T10-O/O) to clean the noise coming from unwanted frequency bands. Following the amplification, the signal was passed through a tunable attenuator (HP 8495B) and a low-noise power detector (Mini-Circuits ZX47-60), then the output voltage was read by a lock-in amplifier (Stanford Research SR830). The modulation signal was used as the reference signal for the lock-in amplifier and accordingly, a calibration was conducted by tuning the attenuation and record the lock-in amplifier readings. The lock-in amplifier readings at each scan location were converted to linear scale according to the calibration. The class scores shown in FIGS. 8A, 8B as well as the FIGS. 10A, 10B and 11A, 11B, were computed as the sum of the calibrated and converted lock-in amplifier output at every scan step within the corresponding class detector opening.

The diffractive optical neural networks 10 were fabricated using a 3D printer (Objet30 Pro, Stratasys Ltd.). Each 3D-printed diffractive optical neural network 10 consisted of an input object 4, five (5) diffractive layers 16 and an output aperture array corresponding to the desired locations of the class detectors 32 (see FIG. 3A). While the active modulation area of the 3D printed diffractive layers 16 was 8 cm×8 cm (106.66λ×106.66λ), they were printed as light modulating insets surrounded by a uniform slab of printed material with a thickness of 0.9 mm. The total size of each printed layer was selected large enough to accommodate the introduced shifts on the $3^{rd}$ diffractive layer 16 location (for misalignment testing), with a total size of 12.8 cm×12.8 cm.

The output aperture array and the 3D-printed MNIST digits were coated with aluminum except the openings and object features. Each aperture at the output plane is a square covering an area of 4.8 mm×4.8 mm, matching the assumed size during the training. The size of the printed MNIST digits (object 4) was 4 cm×4 cm sampled at a rate of 0.4 mm in both x and y directions, matching the training forward model. A 3D-printed holder was used to align the 3D printed input object 4, 5 diffractive layers 16 and the output aperture. Around the location of the $3^{rd}$ layer 16, the holder 18 had additional spatial features that allowed one to move this diffractive layer 16 to thirteen (13) different locations including the ideal one (see FIGS. 7A-7D).

Training of Diffractive Optical Neural Networks

Forward Optical Model

Error-Free $D^2NN$

In a diffractive optical neural network, each unit diffractive feature 20 of a layer 16 represents a complex-valued transmittance learned during the training process that optimizes the thickness, h, of the features based on the complex-valued refractive index of the 3D-fabrication material, τ=n+jκ. The characterization of the printing material in a THz-TDS setup revealed the values of n and κ as 1.7227 and 0.031, respectively, for a monochromatic THz light at 400 GHz. formulation represents the complex-valued transmittance function of a diffractive feature on layer, l, at coordinates ($x_q$, $y_q$, $z_l$) as;

$$t(x_q, y_q, z1) = \exp\left(\frac{-2\pi\kappa\, h(x_q, y_q, z1)}{\lambda}\right)\exp\left(\frac{j2\pi(n - n_{air})(x_q, y_q, z1)}{\lambda}\right), \quad (3)$$

where h($x_q$, $y_q$, $z_l$), $n_{air}$ and $z_l$ denote the thickness of a given feature 20, refractive index of air and the axial location of the layer, l, respectively. From the Rayleigh-Sommerfeld theory of diffraction, one can interpret every diffractive unit on layer, l, at ($x_q$, $y_q$, $z_l$), as the source of a secondary wave, $w^l_q(x, y, z)$, $$w^1_q(x, y, z) = \frac{z - z1}{r^2}\left(\frac{1}{2\pi r} + \frac{1}{j\lambda}\right)\exp\left(\frac{j2\pi r}{\lambda}\right), \quad (4)$$

where $r=((x-x_q)^2+(y-y_q)^2+(z-z_l)^2)^{0.5}$. Therefore, the complex field coming out of the $q^{th}$ feature of $(l+1)^{th}$ layer, $u^{l+1}_q(x,y,z)$ can be written as;

$$u_q^{l+1}(x, y, x) = t(x_q, y_q, z_{l+1}) w_q^{l+1}(x, y, z)\left(\sum_{k \in l} u_k^l(x_q, y_q, z_1 + 1)\right). \quad (5)$$

The diffractive fields and surfaces were sampled at a sampling interval of 0.4 mm that is equal to 0.53λ. The smallest diffractive feature size was also equal to 0.4 mm. The learnable thickness of each feature, h, was defined over an auxiliary variable, $h_a$;

$$h = q\left(\frac{\sin(ha) + 1}{2} h_m\right) + h_b; \quad (6)$$

where $h_m$ and $h_b$ denote the maximum modulation thickness and base thickness, respectively. Taking $h_b$ as 0.5 mm and $h_m$ as 1 mm, the printed thickness values were limited between 0.5 mm and 1.5 mm. The minimum thickness $h_b$ was used to mainly ensure the mechanical stability of the 3D printed layers against cracks and bending. The operator q(.) in Eq. (6) represents the quantization operator. The thickness values to sixteen (16) discrete levels (0.0625 mm per step) were quantized. For the initialization of the diffractive layers at the beginning of the training, the thickness of each feature 20 was taken as a uniformly distributed random variable between 0.9 mm and 1.1 mm, including the base thickness.

Vaccinated $D^2NN$

The training of the vaccinated diffractive optical neural networks 10 follows the same optical forward model outlined in the previous section, except that it additionally introduces statistical variations following the models of the error sources in a diffractive network. The components of the 3D displacement vector of the $l^{th}$ diffractive layer, $D^l=(D^l_x, D^l_y, D^l_z)$, were defined as uniformly distributed random variables defined by Eq. (1). The vaccination strategy uses different sets of displacement vectors at every iteration (batch) to introduce undesired misalignments of the diffractive layers during the training. With $D^{(l,i)}=(D^{(l,i)}_x, D^{(l,i)}_y, D^{(l,i)}_z)$ denoting the random displacement that the $l^{th}$ layer 16 experiences at $i^{th}$ iteration, Eq. (5) was adjusted according to the longitudinal shift of the successive layers, $D_z^{(l,i)}$ and $D_z^{(l+1,i)}$, i.e., the light propagation distances between the diffractive layers were varied at every iteration. To implement the continuous lateral displacement of diffractive layers, the following was used:

$$t^{(l,i)}\left(x + D_x^{(l,i)}, y + D_y^{(l,i)}\right) = \iint T^{)l,i)}(u, v)\exp\left(j2\pi\left(u\left(x + D_x^{(l,i)}\right) + v\left(y + D_y^{(l,i)}\right)\right)\right) du\, dv, \quad (7)$$

where $t^{(l,i)}(x,y)$ denotes the 2-dimensional complex modulation function of layer l, at $i^{th}$ iteration, and $T^{(l,i)}(u,v)$ represents its spatial Fourier transform defined over the 2D spatial frequency space (u,v).

Training of all-Optical and Hybrid Classification Systems

Loss Function and Class Scores

In the forward training model, without loss of generality, the detectors 32 were modelled as ratiometric sensors that capture the ratio of the optical power incident over their active area, $P_d$, and the optical power incident over the object at the input plane, $P_{obj}$. Based on this, the optical signal vector collected by output detectors, $I_d$, was formulated as:

$$I_d = \frac{P_d}{P_{obj}}. \quad (8)$$

For all three diffractive object classification systems depicted in FIGS. 3A-3C, the cost function was defined as the widely-known softmax-cross-entropy (SCE);

$$\mathcal{L} = -\sum_{c=1}^{C} g_c \log\left(\frac{\exp(s_c)}{\sum_{c=1}^{C} \exp(s_c)}\right), \quad (9)$$

where $g_c$, $s_c$ and C denote the binary entry in the label vector, the computed class score for the data class, c, and the number of data classes in a given dataset (e.g., C=10), respectively.

Figure 9A:
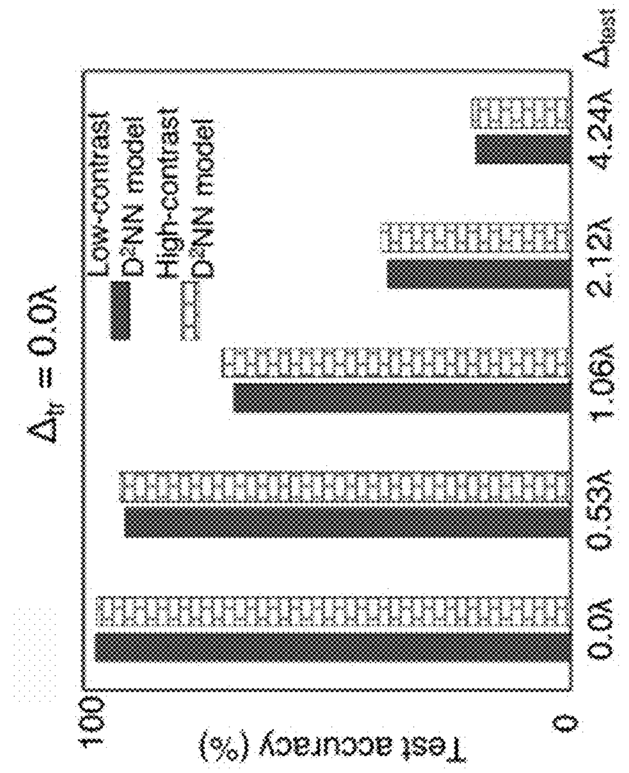
FIGS. 9A and 9B: The comparison between the low-contrast and high-contrast standard diffractive optical neural networks.
Figure 9B:
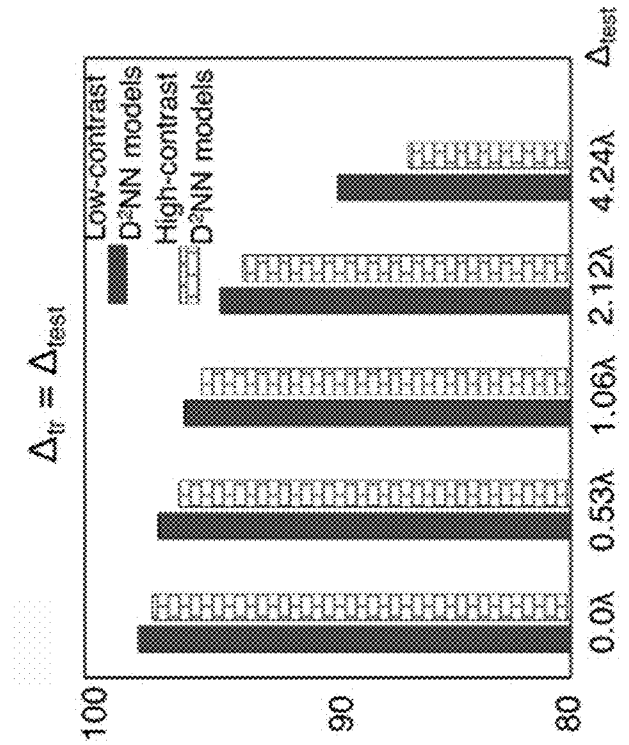
Figure 10A:
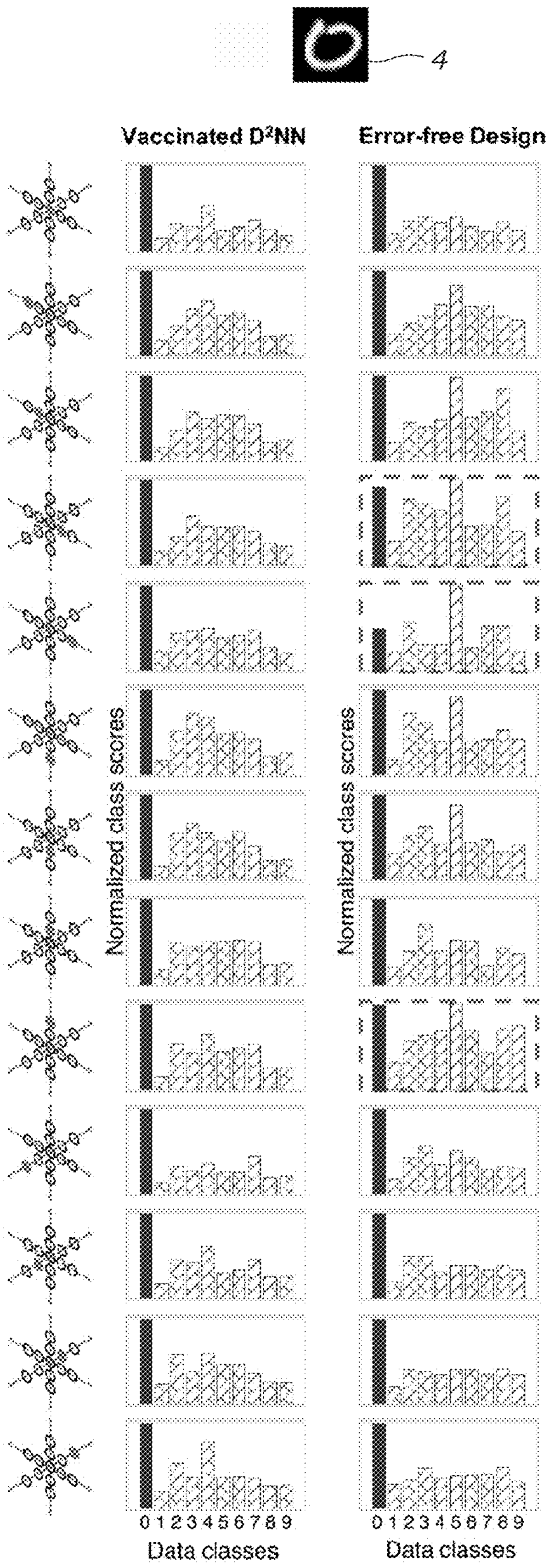
FIGS. 10A and 10B: Experimental image classification results as a function of misalignments.
Figure 10B:
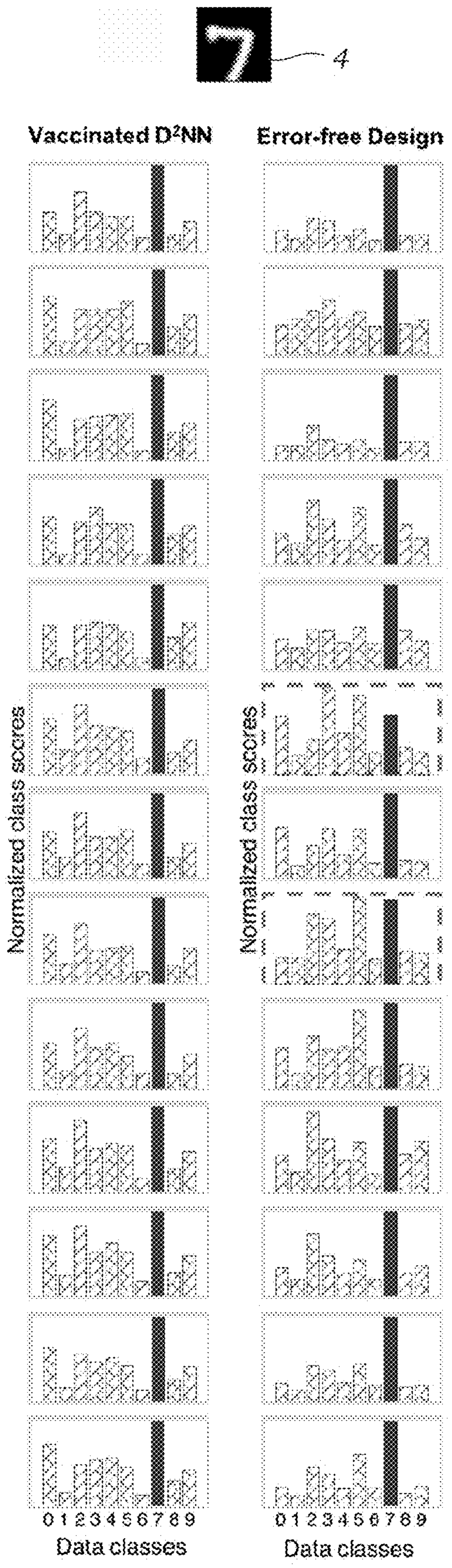
Figure 11A:
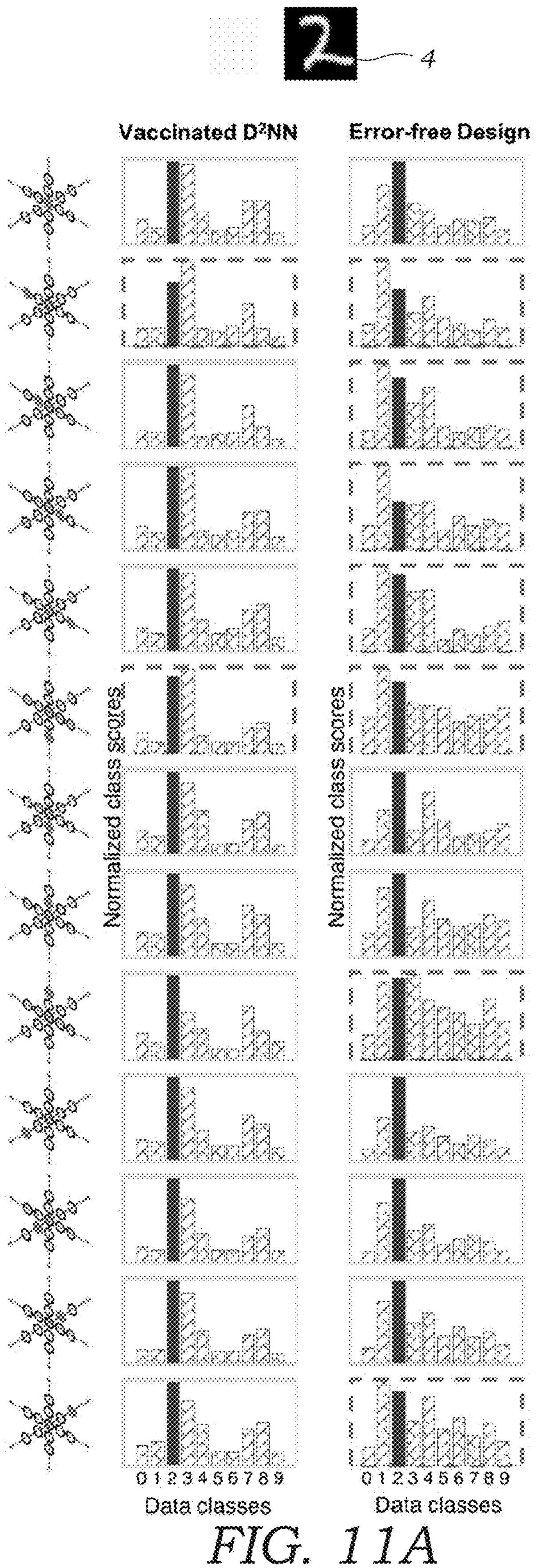
FIGS. 11A and 11B: Experimental image classification results as a function of misalignments.
Figure 11B:
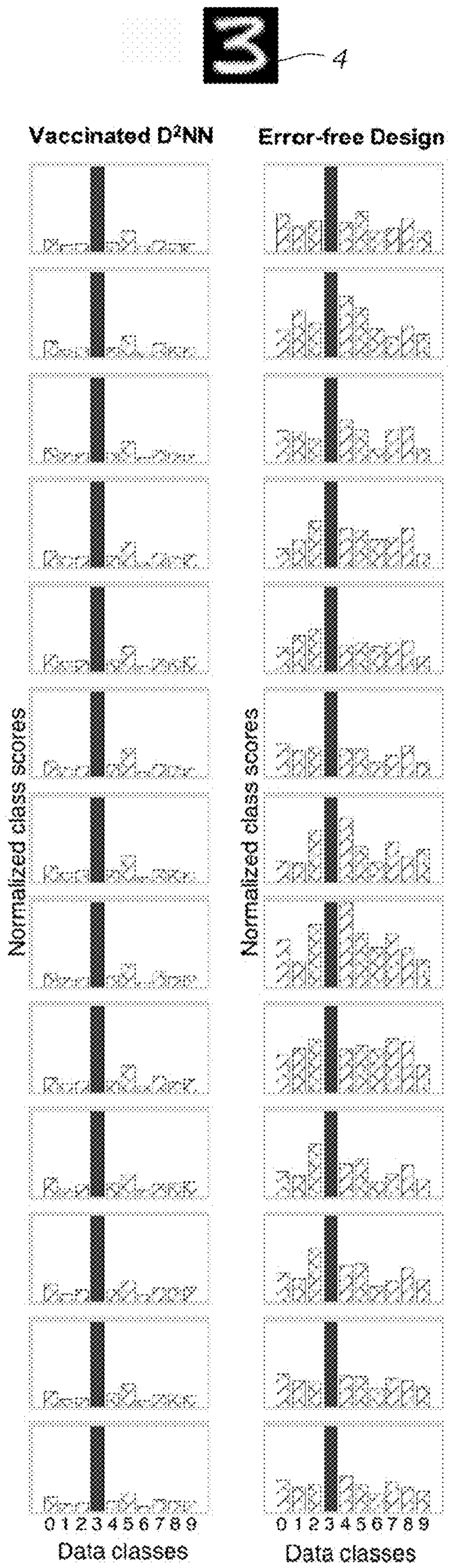
Figure 12A:
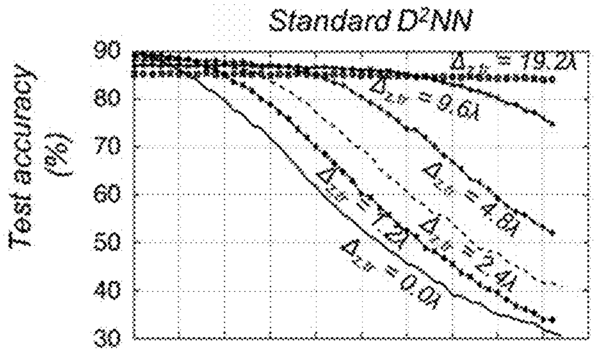
FIGS. 12A-12F: The blind inference accuracies achieved by standard, differential and hybrid diffractive network systems for the classification of phase-encoded Fashion-MNIST images. Same as the FIGS. 4A-4F, except, the image dataset is Fashion-MNIST. Unlike amplitude encoded MNIST images at the input plane, the fashion products were assumed to represent phase-only targets at the object/input plane with their phase values restricted between 0 and $\pi$.
Figure 12D:
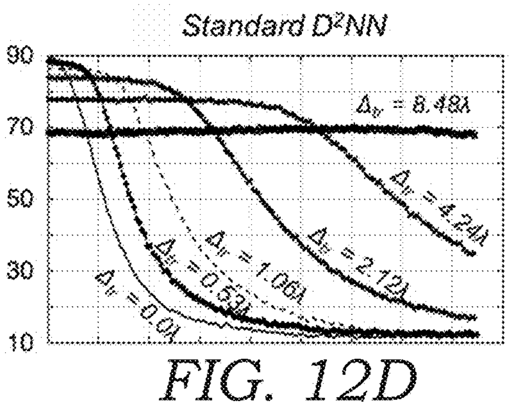
Figure 12B:
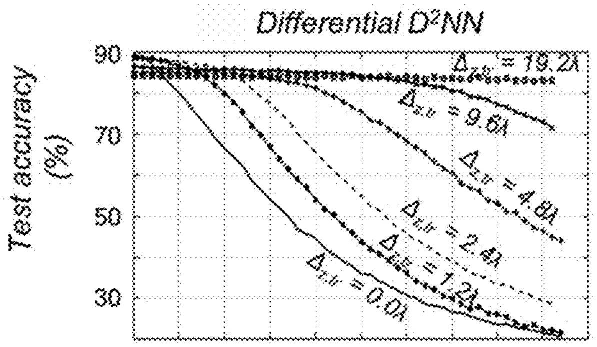
Figure 12E:
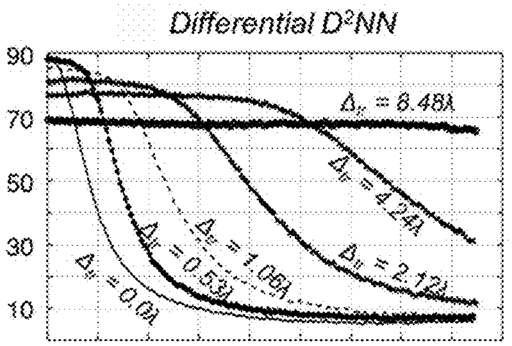
Figure 12C:
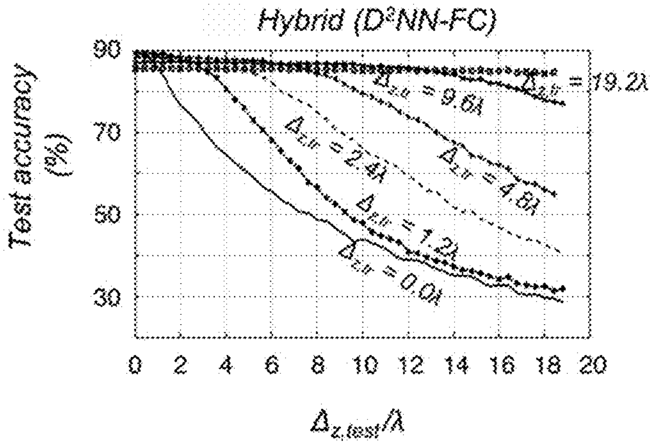
Figure 12F:
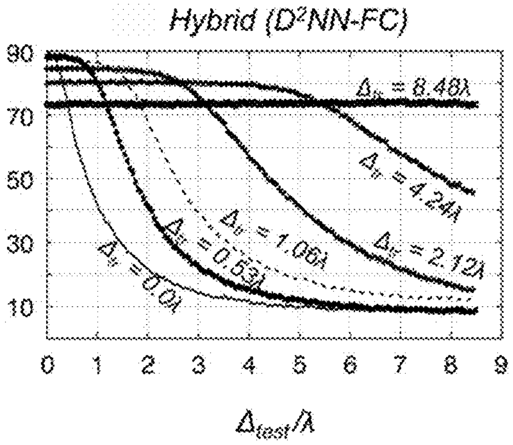
Figure 13G:
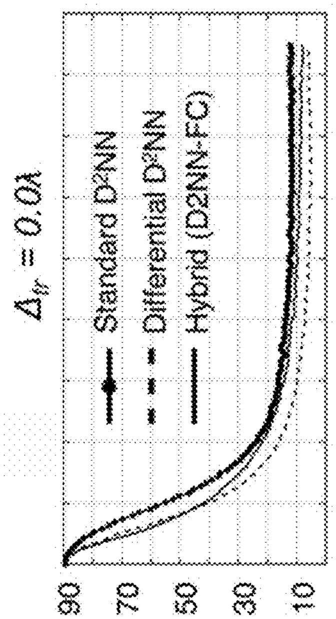
Figure 13H:
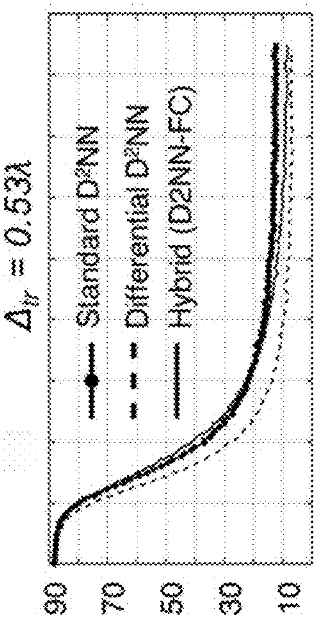
Figure 13I:
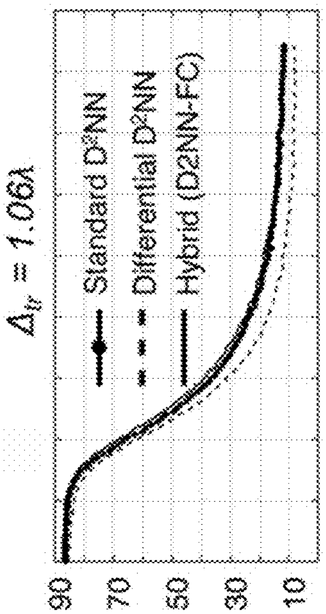
Figure 13J:
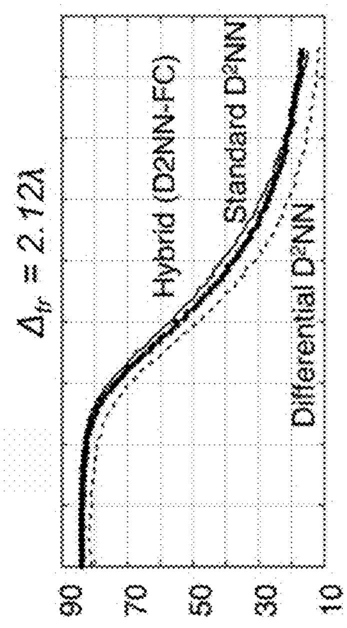
Figure 13K:
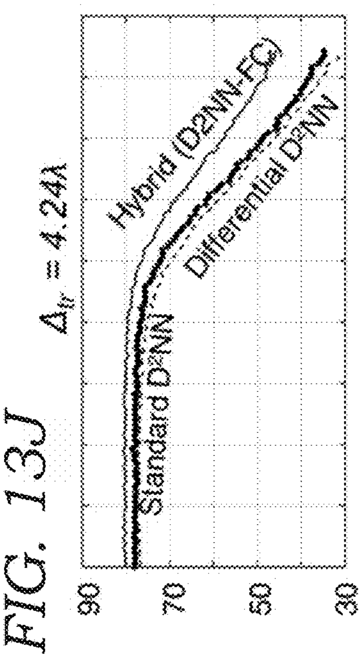
Figure 13L:
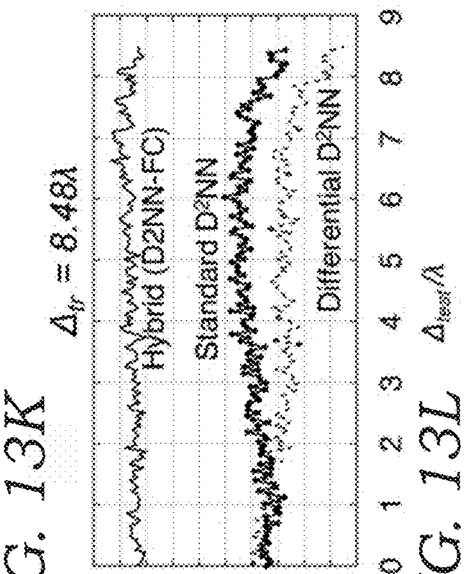

For the standard diffractive optical neural network architecture shown in FIG. 3A, the number of class detectors 32, $N_d$, is equal to the number of data classes, C. In this scheme, the class score vector, s, was computed by:

$$s = T\frac{I_d}{\max(I_d) + \varepsilon}, \quad (10)$$

where T and ε are constants, i.e., non-trainable hyperparameters used during the training phase. The multiplicative factor T was empirically set to be equal to 10 to generate artificial signal contrast at the input of softmax function for more efficient convergence of training. The constant ε, on the other hand, was used to regularize the power efficiency of the standard diffractive object recognition systems. In particular, the standard diffractive neural network models presented in FIGS. 4A, 4D and 5A-5L, as well as in the FIGS. 12A, 12D and 13A-13F, were trained by taking $\varepsilon=10^{-4}$ which results in low power efficiency, η, and low signal contrast, ψ. The 3D-printed diffractive optical neural networks, on the other hand, were trained by setting $\varepsilon=10^{-3}$ to circumvent the effects of the limited signal-to-noise ratio in the experimental system. Trained with a higher ε value, these diffractive networks offer slightly compromised blind testing accuracies while providing significantly improved power efficiency, η, and signal contrast, ψ, which are defined as:

$$\eta = I_{gt}, \quad (11)$$

$$\psi = I_{gt} - I_{SC}, \quad (12)$$

where $I_{gt}$ and $I_{sc}$ denote the optical signals measured by the class detector representing the ground truth label of the input object and its strongest competitor, i.e., the second maximum for a correctly classified input object, respectively. A comparison between the inference performances of low- and high-contrast variants of vaccinated and non-vaccinated standard diffractive optical neural networks under various levels of misalignments is presented in FIG. 9A, 9B. As depicted in FIG. 9A, the high contrast, high efficiency standard diffractive networks are more robust against the undesired system variations/misalignments compared to their low-efficiency counterparts when both networks were trained under error-free conditions. FIG. 9B, on the other hand, compares the standard diffractive network architectures that were tested within the same misalignment range used in their training. In this case, the low-contrast, power inefficient diffractive networks show their higher inference capacity advantage and adapt to the misalignments more effectively than the diffractive classification systems trained to favor higher power efficiency.

In a differential diffractive optical neural network system, the number of detectors is doubled, i.e., $N_d=2C$, where each pair represents the negative, $I_{d-}$, and positive signal vector, $I_{d+}$, contributing to the normalized differential signal, $I_{(d,n)}$ (see FIG. 3B) defined as:

$$I_{(d,n)} = \frac{I_{d+} - I_{d-}}{I_{d+} + I_{d-}}. \tag{13}$$

In parallel, the class scores of a differential diffractive object classification system, s, are calculated by replacing the optical signal vector, $I_d$, in Eq. (10) with the normalized differential signals, $I_{(d,n)}$, depicted in Eq. (13).

It is important to note that the Eqs. (8), (9) and (10) concern only the training stage of diffractive optical neural networks and the associated all-optical object classification systems. Once the training is completed, these equations are not used in the numerical and experimental blind testing, meaning that the class decision is made solely based on $\max(P_d)$ and $\max(P_{(d,n)})$ in standard and differential diffractive network systems, respectively.

In the hybrid neural network models, a 5-layer diffractive optical neural networks were jointly-trained with an electronic network that has a single-layer fully-connected network with only 110 (100 multiplicative weights+10 bias) trainable parameters. During the joint-evolution of these two neural networks, the optical signal collected by the detectors, $I_d$, as depicted in Eq. (10) was normalized with T=1. These normalized detector signals were then fed into the subsequent fully-connected layer in the electronic domain to compute the class scores, s, which was used in Eq. (9) for computing the classification loss before the error-backpropagation through both the electronic and diffractive optical neural networks.

Other Training Related Details

All network models used in this work were trained using Python (v3.6.5) and TensorFlow (v1.15.0, Google Inc.). Adam optimizer was selected during the training of all the models, and its parameters were taken as the default values in TensorFlow and kept identical in each model. The learning rates of the diffractive optical neural networks and the electronic neural network were set to be 0.001 and 0.0002, respectively. The data of handwritten digits and fashion-products were both divided into three parts: training, validation and testing, containing 55K, 5K and 10K images, respectively. All object recognition systems were trained for 50 epochs with a batch size of 50 and the best model was selected based on the highest classification performance on the validation dataset. In the training of MNIST digits, the image information was encoded in the amplitude channel at the object plane, while the Fashion-MNIST objects was assumed to be phase-only targets with their gray levels mapped to phase values between 0 and $\pi$.

While embodiments of the present invention have been shown and described, various modifications may be made without departing from the scope of the present invention. Thus, while the v-$D^2$NN tested was transmission-based, the v-$D^2$NN may be reflection-based. In addition, the errors or artifacts that the v-$D^2$NN may be vaccinated against include not only misalignments but also fabrication-related errors/artifacts and signal noise (e.g., caused by the detector(s) 32. In addition, while a multi-layer diffractive optical neural network 10 was the focus of the experiments, in some embodiments, only a single layer 16 is needed in the diffractive optical neural network 10. The invention, therefore, should not be limited, except to the following claims, and their equivalents.

What is claimed is:

1. A method of forming a diffractive optical neural network comprising one or more layers that are resilient to misalignments, fabrication-related errors, detector noise, and/or other sources of error comprising:

training with a computing device a diffractive optical neural network model to perform one or more specific optical functions for a transmissive and/or reflective optical neural network having one or more optically transmissive and/or optically reflective physical features located in different two dimensional locations in each of the one or more layers, wherein the training comprises feeding an input plane of the diffractive optical neural network model with training images or training optical signals along with random misalignments of the one or more diffractive layers, fabrication-related errors, input plane or output plane misalignments, and/or detector noise, followed by computing an optical output of the diffractive optical neural network model through optical transmission and/or reflection resulting from the optical neural network and iteratively adjusting complex-valued transmission and/or reflection coefficients for each layer until optimized transmission/reflection coefficients are obtained; and manufacturing or having manufactured a physical embodiment of the diffractive optical neural network comprising at least one transmissive and/or reflective layers having physical features that match the optimized transmission/reflection coefficients obtained by the training of diffractive optical neural network model.

2. The method of claim 1, wherein the random misalignments comprise displacement vectors in an x, y, and/or z directions for one or more of the layers and/or displacement vectors in the input plane and/or output plane, wherein x, y, and z are directions in three-dimensional space.

3. The method of claim 1, wherein one or more of the layers comprise reconfigurable spatial light modulators.

4. The method of claim 1, wherein the random misalignment comprises in-plane rotation of one or more of the layers, input plane, and/or output plane.

5. The method of claim 1, wherein the fabrication-related errors comprise additive printing or 3D fabrication errors.

6. The method of claim 1, wherein the physical embodiment of the diffractive optical neural network has an inference performance that is within a range of the inference performance of an equivalent diffractive optical neural network that does not have any misalignments, fabrication-related errors, and/or other sources of error taken into account during training.

7. The method of claim 1, wherein the physical diffractive optical neural network outputs an optical image and/or optical signal to one or more optical detectors.

8. The method of claim 7, wherein the one or more optical detectors comprise one or more optical detectors specifically assigned to a particular object, image, or data class.

9. The method of claim 7, the one or more optical detectors output signal(s) or data to a trained electronic neural network.

10. The method of claim 1, wherein the physical diffractive optical neural network outputs an optical image or optical signal to a plurality of groups of optical detectors configured to sense the output optical images or output optical signals, wherein each group of optical detectors comprises at least one optical detector configured to capture a virtually positive signal from the output optical images or output optical signals and at least one optical detector configured to capture a virtually negative signal from the output optical images or output optical signals.

11. The method of claim 10, wherein the virtually positive and virtually negative signals are used to calculate a differential signal for an input optical image or signal input to the physical diffractive optical neural network to perform an inference and/or classification task.

12. A diffractive optical neural network comprising one or more layers that are resilient to misalignments, fabrication-related errors, detector noise, and/or other sources of error comprising:

one or more optically transmissive layers arranged in an optical path, each of the one or more optically transmissive layers comprising a plurality of physical features formed on or within the one or more optically transmissive layers and having different complex-valued transmission coefficients as a function of lateral coordinates across each layer, wherein the one or more optically transmissive layers and the plurality of physical features thereon collectively define a trained mapping function between an input optical image or input optical signal to the one or more optically transmissive layers and an output optical image or output optical signal created by optical diffraction through the one or more optically transmissive layers, the trained mapping function being resilient to one or more of: misalignment of one or more of the optically transmissive layers, misalignment of an input plane, misalignment of an output plane, fabrication-related errors in the optically transmissive layers and/or in the diffractive network, detector noise, and/or other sources of error; and one or more optical detectors configured to capture the output optical image or output optical signal resulting from the one or more optically transmissive layers.

13. The diffractive optical neural network of claim 12, wherein one or more of the layers comprise reconfigurable spatial light modulators.

14. The diffractive optical neural network of claim 12, wherein the misalignment(s) and/or fabrication-related errors comprise displacement vectors in an x, y, and/or z directions for one or more of the layers and/or displacement vectors in the input plane and/or the output plane, wherein x, y, and z are directions in three-dimensional space.

15. The diffractive optical neural network of claim 12, wherein the misalignment(s) comprises in-plane rotation of one or more of the layers, the input plane, and/or the output plane.

16. The diffractive optical neural network of claim 12, wherein the fabrication-related errors comprise additive printing or 3D fabrication errors.

17. The diffractive optical neural network of claim 12, wherein the diffractive optical neural network has an inference performance that is within a range of the inference performance of an equivalent diffractive optical neural network that does not have any misalignments, fabrication-related errors, and/or other sources of error taken into account during training.

18. The diffractive optical neural network of claim 12, wherein the diffractive optical neural network outputs an optical image and/or optical signal to one or more optical detectors.

19. The diffractive optical neural network of claim 18, wherein the one or more optical detectors comprise one or more optical detectors specifically assigned to a particular object, image, or data class.

20. The diffractive optical neural network of claim 18, further comprising a trained electronic neural network, wherein the one or more optical detectors output signal(s) or data to the trained electronic neural network.

21. The diffractive optical neural network of claim 12, wherein the diffractive optical neural network outputs an optical image or optical signal to a plurality of groups of optical detectors configured to sense the output optical images or output optical signals, wherein each group of optical detectors comprises at least one optical detector configured to capture a virtually positive signal from the output optical images or output optical signals and at least one optical detector configured to capture a virtually negative signal from the output optical images or output optical signals.

22. The diffractive optical neural network of claim 12, wherein the virtually positive and virtually negative signals are used to calculate a differential signal for an input optical image or signal input to the diffractive optical neural network to perform an inference and/or classification task.

23. A diffractive optical neural network comprising one or more layers that are resilient to misalignments, fabrication-related errors, detector noise, and/or other sources of error comprising:

one or more optically reflective layers arranged along an optical path, each of the one or more optically reflective layers comprising a plurality of physical features formed on or within the one or more optically reflective layers, wherein the one or more optically reflective layers and the plurality of physical features collectively define a trained mapping function between an input optical image or input optical signal to the one or more optically reflective layers and an output optical image or output optical signal from the one or more optically reflective layers, the trained mapping function being resilient to one or more of: misalignment of one or more of the optically reflective layers, misalignment of an input plane, misalignment of an output plane, fabrication-related errors in the optically reflective layers and/or the diffractive network, detector noise, and/or other sources of error; and one or more optical detectors configured to capture the output optical image or output optical signal from the one or more optically reflective layers.

24. The diffractive optical neural network of claim 23, wherein one or more of the layers comprise reconfigurable spatial light modulators.

25. The diffractive optical neural network of claim 23, wherein the misalignment(s) and/or fabrication-related errors comprise displacement vectors in an x, y, and/or z directions for the one or more layers and/or displacement vectors in the input plane and/or the output plane, wherein x, y, and z are directions in three-dimensional space.

26. The diffractive optical neural network of claim 23, wherein the misalignment(s) comprises in-plane rotation of the one or more layers, the input plane, and/or the output plane.

27. The diffractive optical neural network of claim 23, wherein the fabrication-related errors comprise additive printing or 3D fabrication errors.

28. The diffractive optical neural network of claim 23, wherein the diffractive optical neural network has an inference performance that is within a range of the inference performance of an equivalent diffractive optical neural network that does not have any misalignments, fabrication-related errors, and/or other sources of error taken into account during training.

29. The diffractive optical neural network of claim 23, wherein the diffractive optical neural network outputs an optical image and/or optical signal to one or more optical detectors.

30. The diffractive optical neural network of claim 29, wherein the one or more optical detectors comprise one or more optical detectors specifically assigned to a particular object, image, or data class.

31. The diffractive optical neural network of claim 29, further comprising a trained electronic neural network, wherein the one or more optical detectors output signal(s) or data to the trained electronic neural network.

32. The diffractive optical neural network of claim 23, wherein the diffractive optical neural network outputs an optical image or optical signal to a plurality of groups of optical detectors configured to sense the output optical images or output optical signals, wherein each group of optical detectors comprises at least one optical detector configured to capture a virtually positive signal from the output optical images or output optical signals and at least one optical detector configured to capture a virtually negative signal from the output optical images or output optical signals.

33. The diffractive optical neural network of claim 23, wherein the virtually positive and virtually negative signals are used to calculate a differential signal for an input optical image or signal input to the diffractive optical neural network to perform an inference and/or classification task.

* * * * *